(12) United States Patent
Shkolnik et al.

(10) Patent No.: US 11,149,547 B2
(45) Date of Patent: Oct. 19, 2021

(54) SEAL ASSEMBLY FOR AN EPITROCHOIDAL ROTARY ENGINE

(71) Applicant: LiquidPiston, Inc., Bloomfield, CT (US)

(72) Inventors: Alexander Shkolnik, Wilmington, MA (US); Nikolay Shkolnik, West Hartford, CT (US); Mark Nickerson, West Hartford, CT (US); Daniele Littera, West Hartford, CT (US); Alexander Kopache, Sand Lake, NY (US); Kyle Becker, Andover, MA (US)

(73) Assignee: LiquidPiston, Inc., Bloomfield, CT (US)

( * ) Notice: Subject to any disclaimer, the term of this patent is extended or adjusted under 35 U.S.C. 154(b) by 497 days.

(21) Appl. No.: 15/700,641

(22) Filed: Sep. 11, 2017

(65) Prior Publication Data

US 2018/0023392 A1    Jan. 25, 2018

Related U.S. Application Data

(63) Continuation of application No. PCT/US2016/021861, filed on Mar. 10, 2016.
(Continued)

(51) Int. Cl.
*F01C 19/08* (2006.01)
*F01C 1/22* (2006.01)
*F01C 21/06* (2006.01)

(52) U.S. Cl.
CPC ............... *F01C 19/08* (2013.01); *F01C 1/22* (2013.01); *F01C 21/06* (2013.01)

(58) Field of Classification Search
CPC .. F01C 19/08; F01C 1/22; F01C 21/06; F01C 21/08; F01C 21/02; F01C 19/02; F01C 19/10; F01N 5/02; F02B 53/00; F02B 53/02; F02B 55/02; F02B 55/06; F02B 55/14; F02B 63/042; F02M 25/0222;
(Continued)

(56) References Cited

U.S. PATENT DOCUMENTS 2,048,416 A    7/1936  Tucker
2,074,581 A    3/1937  Frye
(Continued)

FOREIGN PATENT DOCUMENTS

CA    2261321    8/2000
DE    1551120    9/1969
(Continued)

OTHER PUBLICATIONS

European Patent Office, Communication Pursuant to Rule 164(1) EPC, Partial Supplementary European search report; Application No. 16762553.2-1-1004; 11 pages, dated Sep. 14, 2018.
(Continued)

*Primary Examiner* — Mary Davis
*Assistant Examiner* — Paul W Thiede
(74) *Attorney, Agent, or Firm* — Sunstein LLP

(57) ABSTRACT

Various embodiments describe modifications to X-engines, which would utilize a dedicated chamber to implement bottoming Rankine cycle as well as additional improvements in sealing and combustion efficiency—all contributing to high efficiency. Improvements in sealing include a face seal having multiple surfaces.

11 Claims, 22 Drawing Sheets

Related U.S. Application Data

(60) Provisional application No. 62/137,584, filed on Mar. 24, 2015, provisional application No. 62/130,956, filed on Mar. 10, 2015.

(58) Field of Classification Search
CPC .. F02M 25/025; F02M 25/032; Y02T 10/121; Y02T 10/16; Y02T 10/17; F04C 15/06; F04C 11/008; F04C 15/0023; F04C 21/0026
USPC ...... 418/133, 142, 61.2, 113, 131, 132, 134, 418/135; 123/203, 241
See application file for complete search history.

(56) References Cited

U.S. PATENT DOCUMENTS

| | | | |
|---|---|---|---|
| 3,112,870 A | | 12/1963 | Bentele |
| 3,198,531 A | | 8/1965 | Brenneke |
| 3,224,421 A | | 12/1965 | Peras |
| 3,369,738 A | * | 2/1968 | Rottmann ............... F01C 19/10 418/61.2 |
| 3,410,254 A | | 11/1968 | Huf |
| 3,645,174 A | | 2/1972 | Prasse |
| 3,834,845 A | | 9/1974 | Siler |
| 3,903,767 A | | 9/1975 | Kupersmith |
| RE28,714 E | * | 2/1976 | Ruf ....................... F01C 19/08 418/142 |
| 4,029,446 A | | 6/1977 | Mayer et al. |
| 4,058,321 A | * | 11/1977 | Gavrun ................. F01C 19/08 277/357 |
| 4,061,447 A | * | 12/1977 | Kato ..................... F01C 19/08 418/142 |
| 4,080,118 A | | 3/1978 | Yamamoto et al. |
| 4,486,159 A | | 12/1984 | Garside |
| 4,738,453 A | * | 4/1988 | Ide ....................... F16J 15/3432 277/398 |
| 5,450,783 A | | 9/1995 | Binford |
| 6,347,575 B1 | | 2/2002 | Booher |
| 6,382,540 B1 | * | 5/2002 | Takikura ............ A01K 89/0108 242/231 |
| 8,365,698 B2 | | 2/2013 | Shkolnik et al. |
| 8,523,546 B2 | | 9/2013 | Shkolnik et al. |
| 8,794,211 B2 | | 8/2014 | Shkolnik et al. |
| 8,863,724 B2 | | 10/2014 | Shkolnik et al. |
| 2003/0184022 A1 | * | 10/2003 | Brauer .................. F01D 11/02 277/412 |
| 2004/0129018 A1 | * | 7/2004 | Rini ....................... F28D 7/026 62/507 |
| 2007/0272078 A1 | | 11/2007 | Yamada et al. |
| 2008/0029059 A1 | * | 2/2008 | Isbrecht ................ F01C 11/008 123/203 |
| 2008/0141973 A1 | | 6/2008 | Shkolnik et al. |
| 2011/0189043 A1 | * | 8/2011 | Watanabe ............... F04C 15/06 418/133 |
| 2011/0259002 A1 | | 10/2011 | Hanson |
| 2012/0171047 A1 | | 7/2012 | Itzel et al. |
| 2012/0294747 A1 | | 11/2012 | Shkolnik et al. |
| 2013/0028774 A1 | | 1/2013 | Gekht et al. |
| 2014/0209056 A1 | | 7/2014 | Shkolnik et al. |
| 2015/0315913 A1 | | 11/2015 | Peter |

FOREIGN PATENT DOCUMENTS

| | | | |
|---|---|---|---|
| DE | 2825434 A1 * | 12/1978 | ............. F01C 19/08 |
| DE | 102004012962 | 9/2004 | |
| DE | 103 48 294 A1 | 5/2005 | |
| FR | 2239895 | 2/1975 | |
| FR | 2254980 | 7/1975 | |
| FR | 2 574 517 | 6/1985 | |
| GB | 1046504 | 10/1966 | |
| GB | 1067229 | 5/1967 | |
| JP | 51-144604 | 12/1976 | |
| JP | 51-150305 | 12/1976 | |
| JP | 54-111507 | 8/1979 | |
| JP | 62-72402 | 5/1987 | |
| JP | 6272402 | 5/1987 | |
| JP | 484729 | 7/1992 | |

OTHER PUBLICATIONS

Hart, Jack A., Certificate of Correction; U.S. Pat. No. 3,903,767, dated Jan. 6, 1976, 1 page.

Vizard, David, Perfecting the Combustion Process for More Power, Part 11, Muscle Car DIY, 43 pages, Jan. 16, 2015.

International Searching Authority, International Search Report—International Application No. PCT/US2016/021861, dated Jul. 5, 2016, together with the Written Opinion of the International Searching Authority, 24 pages.

Japanese Patent Office—Office Action—Notice of Reasons for Rejection—JP Application No. 2017-546072 dated Feb. 13, 2020 with English translation, 18 pages.

* cited by examiner

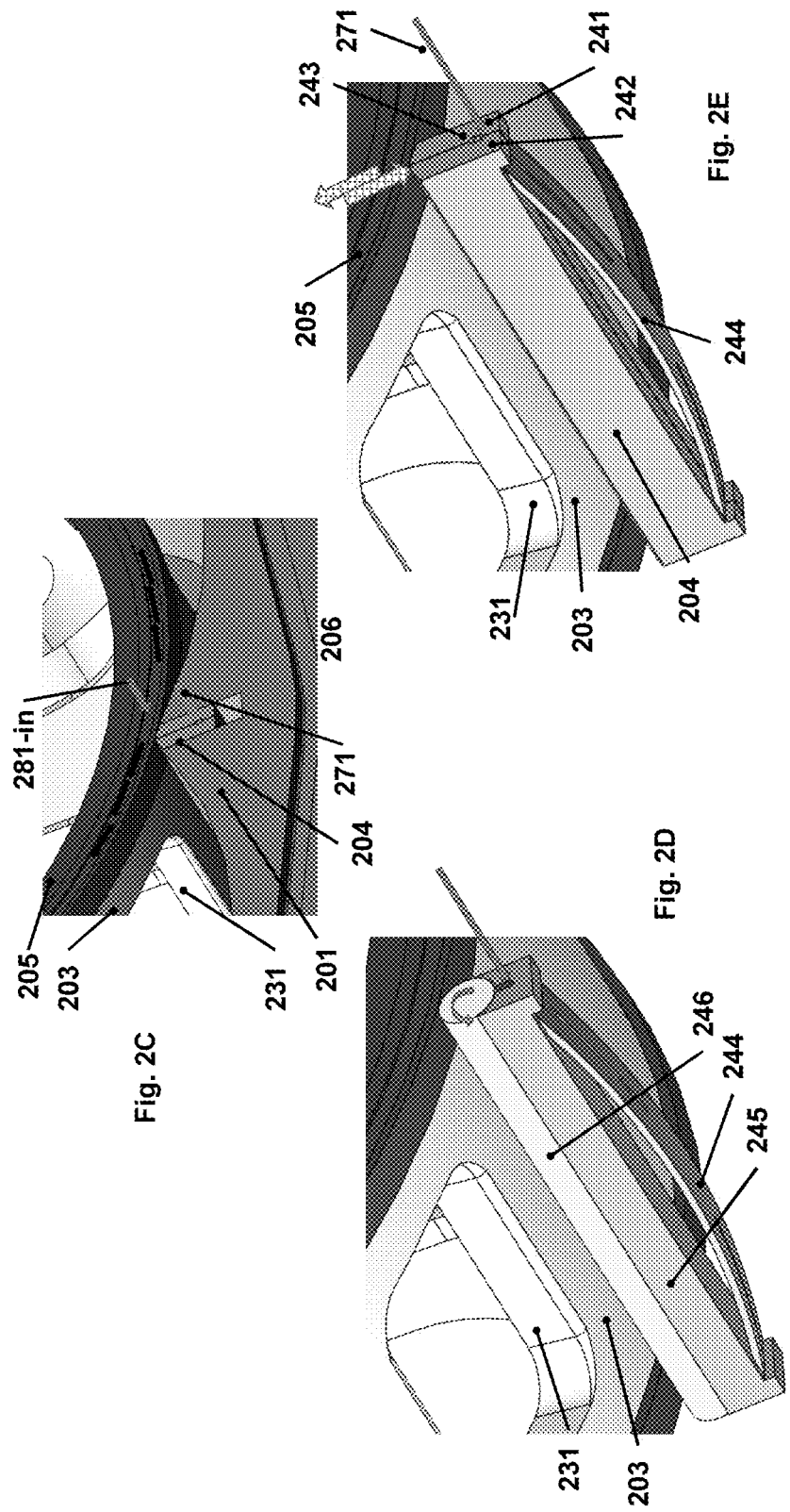

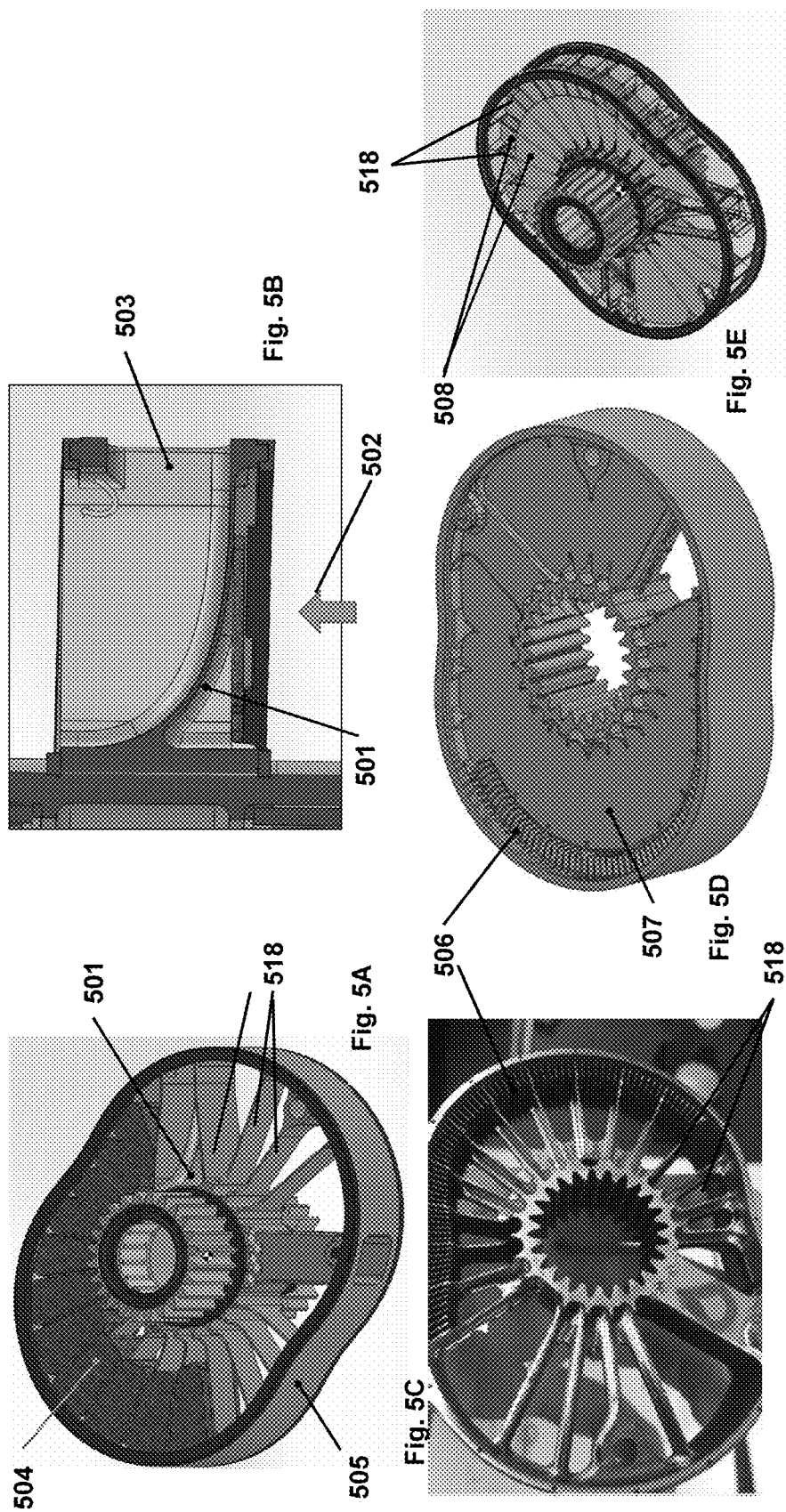

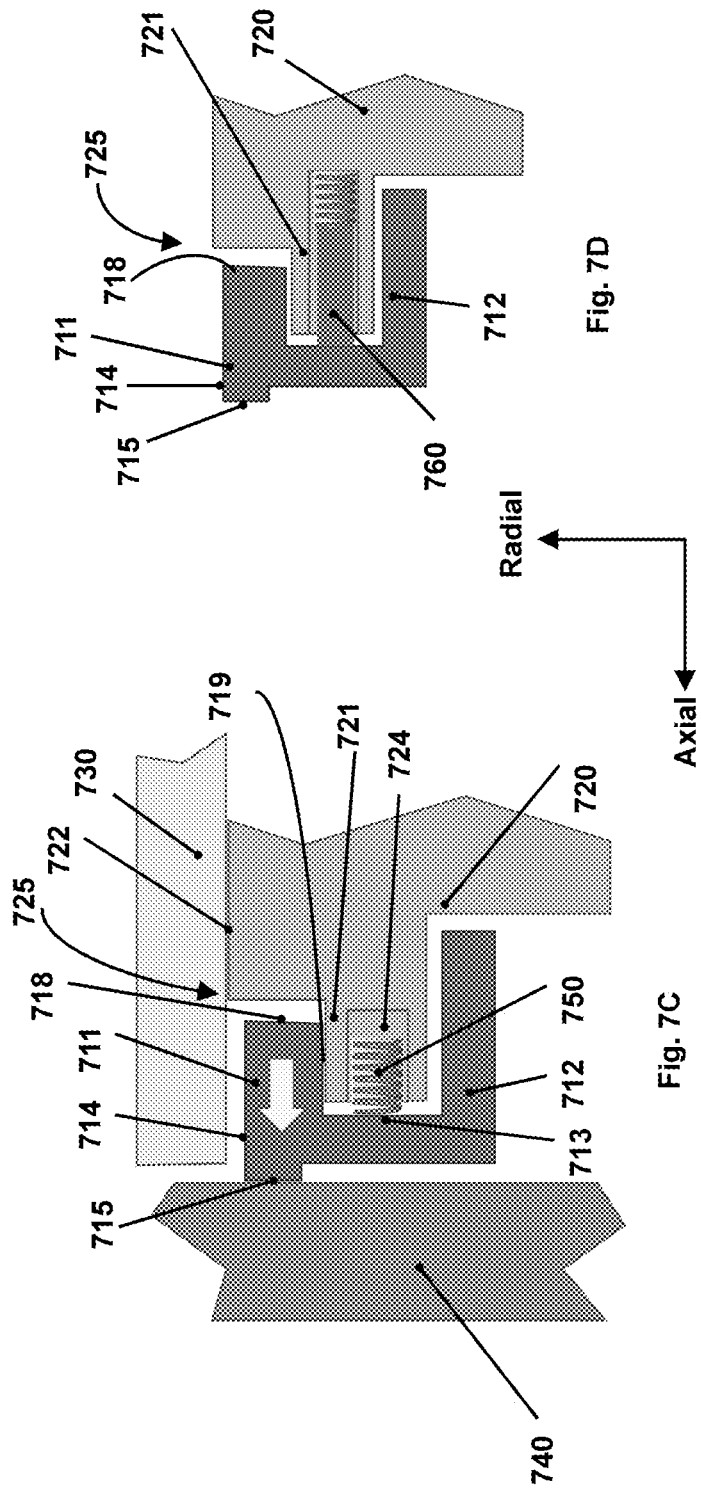

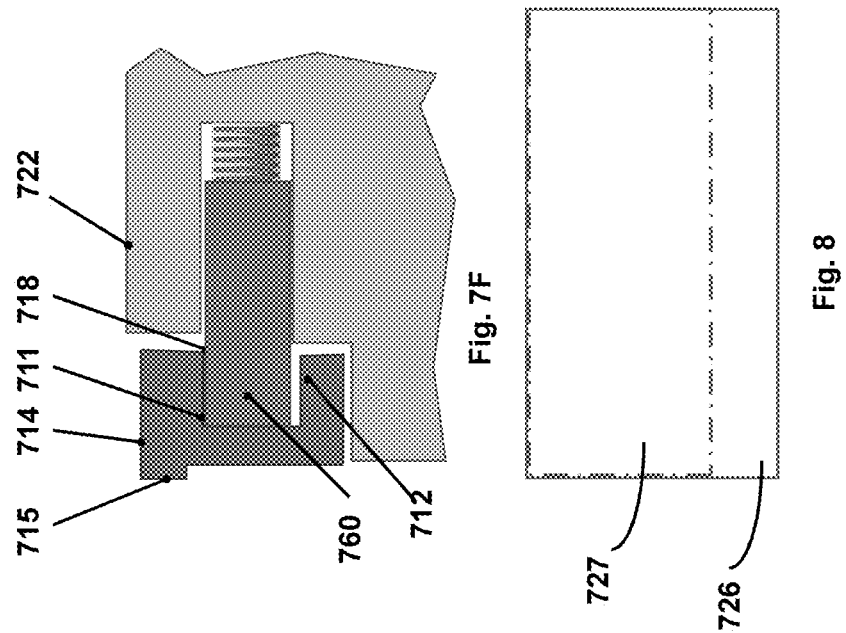
Fig. 7F
Fig. 8
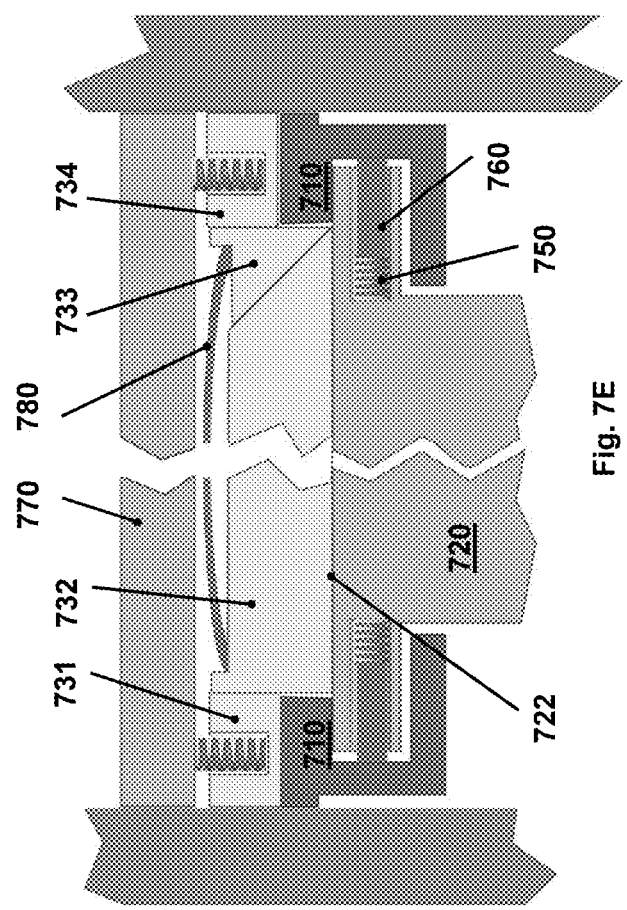
Fig. 7E

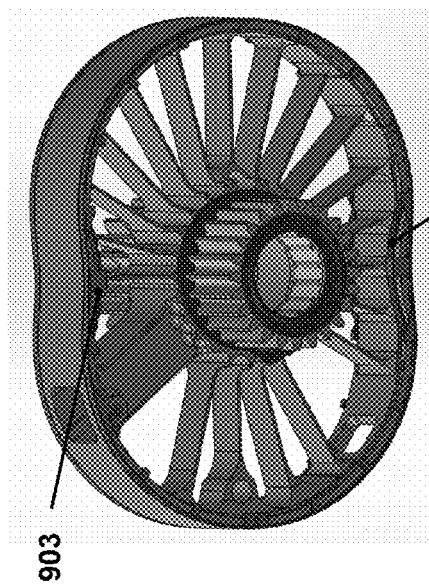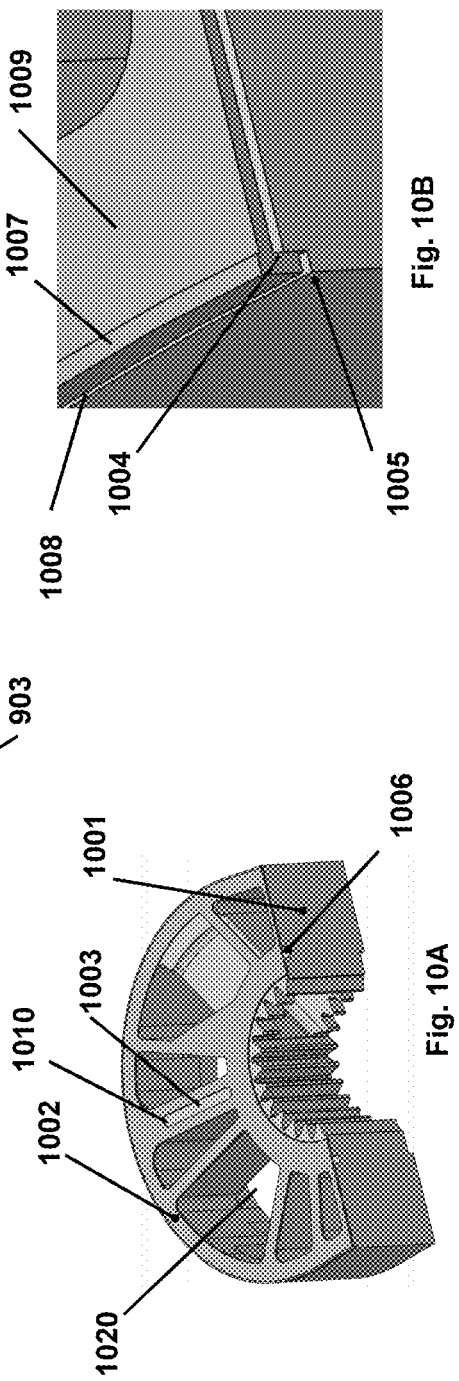

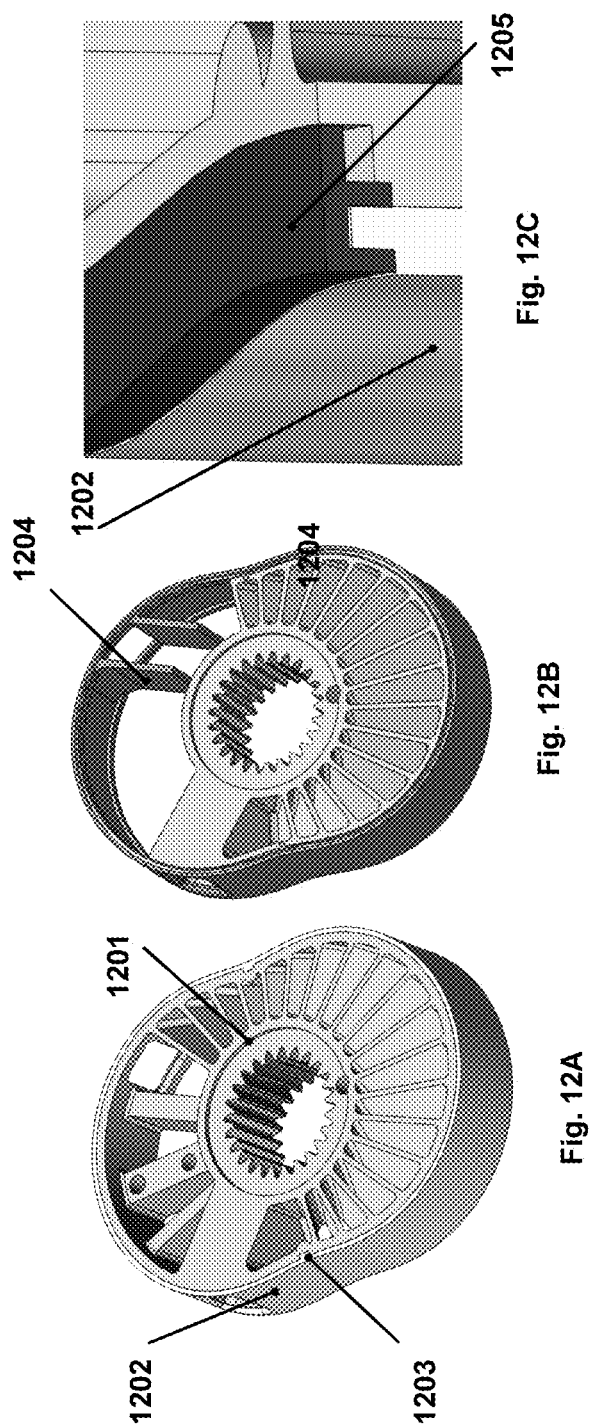

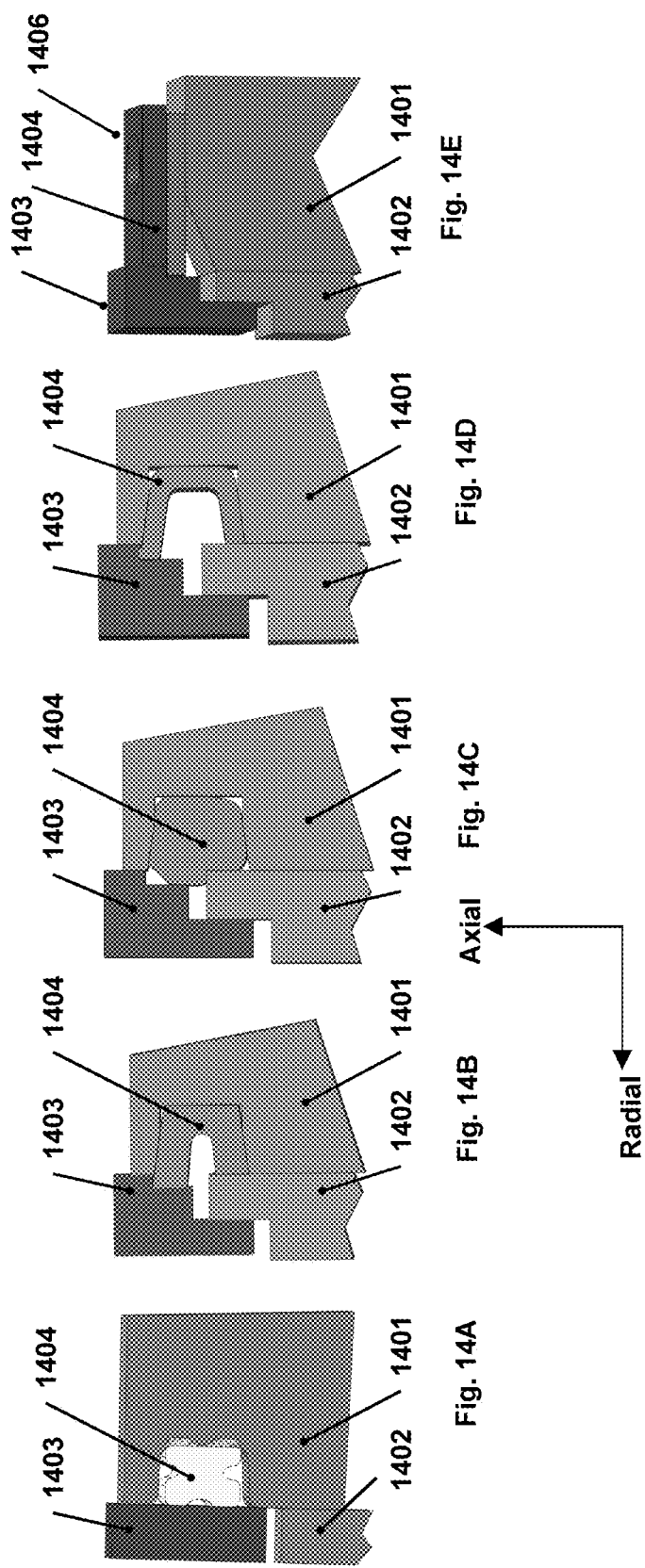

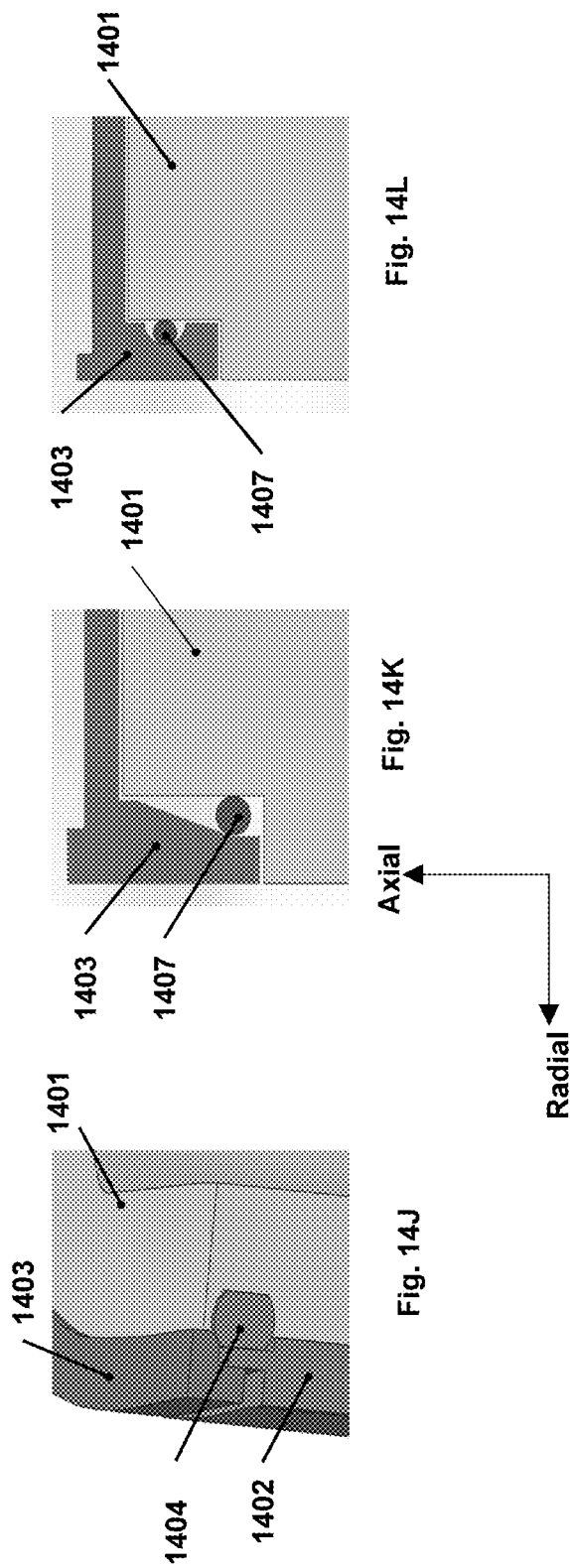

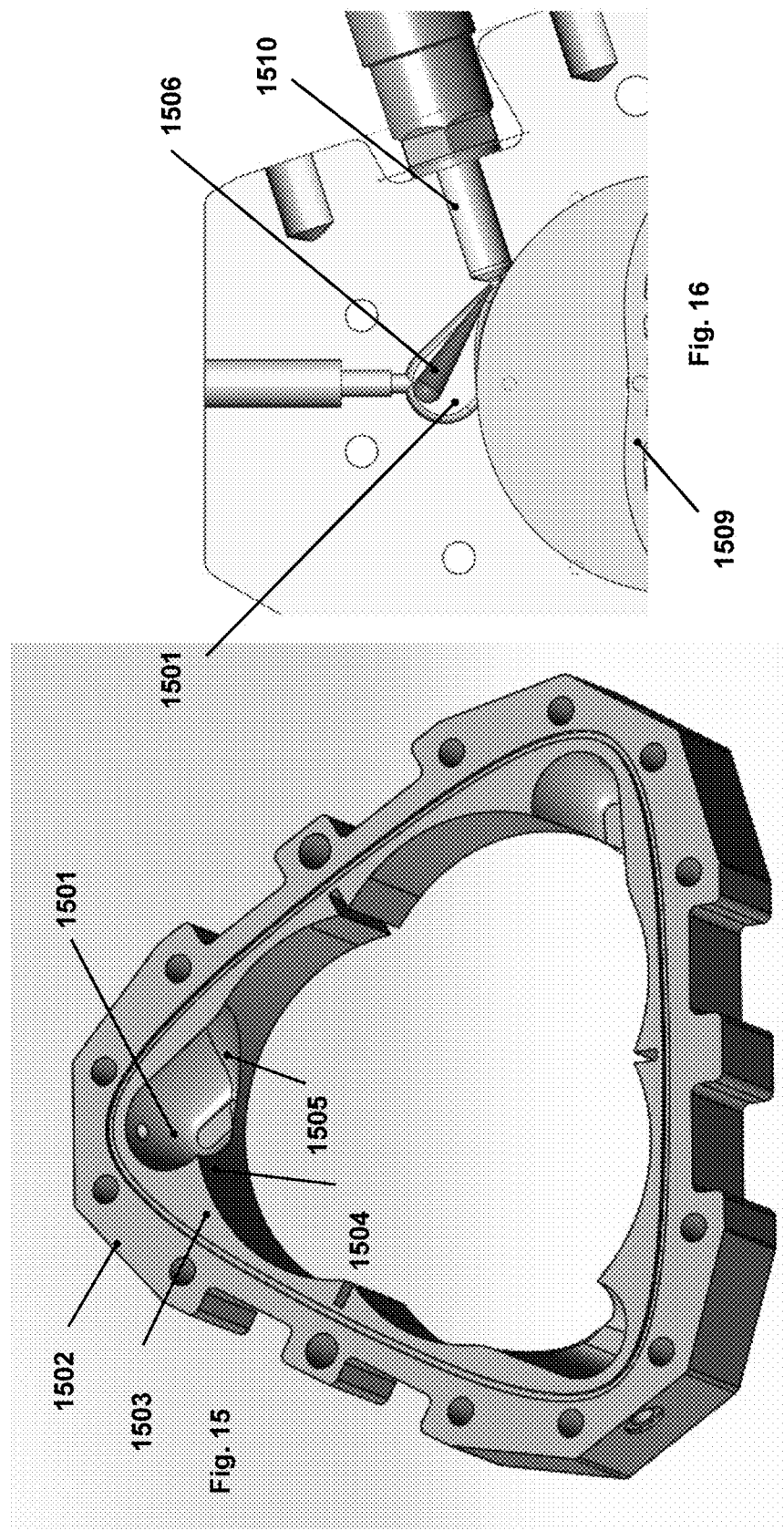

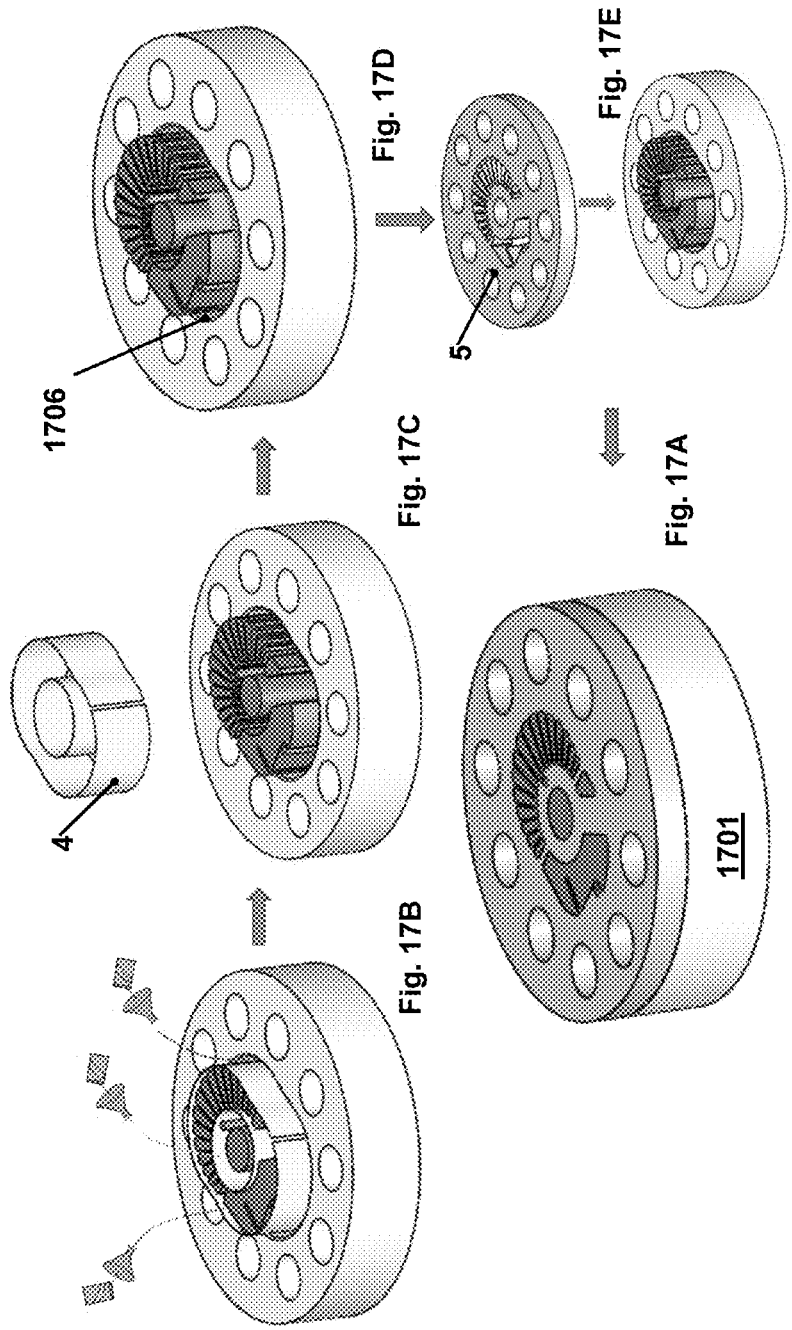

SEAL ASSEMBLY FOR AN EPITROCHOIDAL ROTARY ENGINE

CROSS-REFERENCE TO RELATED APPLICATIONS

The present application is a continuation of International Application PCT/US2016/021861, titled "High Power Density and Efficiency Epitrochoidal Rotary Engine," with an international filing date of Mar. 10, 2016, naming Alexander Shkolnik, Nikolay Shkolink, Mark Nickerson, Daniele Littera, Alexander Kopache, and Kyle Becker as inventors, and claims priority from U.S. provisional application Ser. No. 62/130,956, titled "Epitrochoidal Rotary Engines," filed: Mar. 10, 2015 and naming Alexander Shkolnik, Nikolay Shkolnik, Mark Nickerson, Daniele Littera, and Alexander Kopache as inventors; and also claims priority from U.S. provisional application Ser. No. 62/137,584, titled "Heat Engine with Improved Lubrication and Bottoming Cycle," filed: Mar. 24, 2015 and naming Alexander Shkolnik, Nikolay Shkolnik, Mark Nickerson, Daniele Littera, and Alexander Kopache as inventors. All of the foregoing applications are hereby incorporated herein by reference in their entirety.

The present application may be related to all or any of the following U.S. patents:

U.S. Pat. No. 8,365,698 titled Hybrid Cycle Combustion Engine and Methods and issued to Shkolnik et al. on Feb. 5, 2013;

U.S. Pat. No. 8,523,546 titled "Cycloid Rotor Engine" and issued to Shkolnik et al. on Sep. 3, 2013;

U.S. Pat. No. 8,794,211, titled "Hybrid Cycle Combustion Engine and Methods" and issued to Shkolnik et al. on Aug. 15, 2014; and U.S. Pat. No. 8,863,724 titled "Isochoric heat addition engines and methods" and issued to N. Shkolnik et al on Oct. 21, 2014;

all of which are incorporated herein by reference in their entirety.

TECHNICAL FIELD

The present invention relates to rotary machines, and more particularly to a rotary engines, rotary compressors, rotary pumps, and a rotary expanders.

BACKGROUND ART

A topping cycle (typically a turbine engine or internal combustion engine) typically rejects >30% of the heat available in fuel in the exhaust. A bottoming cycle is simply a second heat engine that is able to utilize the rejected heat from the topping cycle, and contribute additional mechanical energy to the shaft, thereby boosting overall efficiency. It is not uncommon for a large (MW scale) natural gas power plant to achieve 40% efficiency in its topping cycle, and then 50-60% overall efficiency through the combined cycle. This comes at expense of extra components, with associated cost and usually only feasible for large stationary power systems.

Advances in fuel injection technology are also used to improve efficiency by making use of higher injection pressures—2,000 to 2,500 bar injection pressure is typical in modern engines today. This comes at expense of high parasitic losses to the engine (due to very high pressure pumps, etc.) and are bulky and extremely expensive. Smaller engines often can't afford the expense and bulk of these systems.

To increase the power density, 2-stroke engines are often used. Also turbo- or super-charged engines are gaining wide acceptance and popularity today. They are typically expensive and complex to manufacture and maintain.

Water injection (WI), was used in engines dating to WWII to increase the power of airplane engines. Researchers indicated that WI can also boost efficiency on the order of 2-5% depending upon when during the cycle the water is injected—during the compression, combustion or expansion strokes, or as additional stroke (so called 6-stroke engines). The US Army has also conducted successful research on elimination of the engine water jacket (external cooling) in favor of direct water injection as a means to internally cool the engine.

To the best of our knowledge, no one has attempted to design a power plant utilizing all, or at least most of the available measures in a coherent and synergetic way, i.e., taking the system-level approach to designing such powerplant.

This invention is our attempt at solving high efficiency and high power density for both large and small engines from the system-level design perspective.

SUMMARY OF THE EMBODIMENTS

The present application describes embodiments of compact rotary engines, with a plurality of improved sealing assemblies, which optionally further utilize water injection through the sealing assembly to internally cool the engine, thereby reducing heat loss to external cooling, with the benefit that the internal coolant combines with the engine exhaust, making the combined heat of exhaust and the heat lost to cooling available to a bottoming cycle of the engine, and where the engine can optionally improve its power density by incorporating an integral supercharging mechanism.

In accordance with one embodiment of the invention, there is provided a seal assembly for sealing a gap between an axial surface of a rotor of a rotary machine and a side housing of the machine. The seal assembly includes a face seal having an outer member (711) having (i) an axial contact surface (715), axially loaded against the side housing (740), and residing in a peripheral corner cut-out of the rotor (725), (ii) at least one other fluid-pressure receiving surface (714, 718) and (iii) an inner radial contact surface (719) that is radially loaded against the rotor by fluid pressure. The face seal and the peripheral corner cut-out of the rotor are shaped so that the face seal is constrained to be within the cut-out. Additionally, the axial contact surface and the at least one other fluid-pressure receiving surface are shaped so that the fluid pressure causes a net force by which the axial contact surface is urged axially against the side housing and the inner radial contact surface of the outer member is urged radially against the rotor.

In the case of a rotary internal combustion engine (e.g. 101), the fluid that pressurizes the seal may be the air-fuel mixture gas that fills each working chamber. In a further related embodiment, the face seal further includes a bridge member (713) coupled to the outer member, spanning a radial distance inwardly from the outer member.

In another related embodiment, the face seal further incudes an axially loaded spring (750) disposed between the bridge member and a feature of the rotor (720), so as to cause axial loading of the axial contact surface against the side housing. Optionally, the seal assembly includes a secondary seal (760), disposed between the axially loaded spring and the bridge member, so that the secondary seal is axially pre-loaded by the spring against the primary seal. This seal is further axially energized against the primary seal and radially loaded against the rotor ridge (721) by pressure of any fluid that has blown by the inner radial contact surface.

Some embodiments also include a flexible secondary seal (1304), disposed radially between the rotor and the face seal.

Some embodiments also include a set of springs (903), coupled to the face seal and the rotor and configured to pull the outer member radially toward the rotor axis.

Some embodiments also include a plate member (1009) connected to the outer member and disposed along the axial surface in a direction radially inward from the outer member; and an anti-rotation slot (1010) disposed within the plate member to receive a corresponding axially projecting ridge (1003) of the rotor to prevent rotation of the face seal relative to the rotor. In some embodiments, the plate member includes a set of openings (1020) therein to allow passage of cooling air through the rotor.

Another embodiment teaches an improved internal combustion engine of the type using seals to close gaps between surfaces of a moving member and of a housing of the engine, the engine having a working chamber and an exhaust, wherein the improvement includes: a source of a pressurized evaporative liquid; and a conduit defining a passageway of the evaporative liquid to at least one of the seals, so that the evaporative liquid comes into contact with the surfaces and at least a part of the evaporative liquid undergoes a phase change to a gas when exposed to heat by the surfaces, the gas escaping into the working chamber of the engine and thereafter becoming a part of the engine exhaust, and heat is removed from the engine as a result of the phase change. Optionally, the internal combustion engine is of a reciprocating piston type. Optionally, the internal combustion engine is of a rotary type.

The evaporative liquid may help to lubricate the seal interface, while also removing heat from the engine thereby reducing or eliminating external cooling requirements (e.g. the "water jacket" typically employed to cool an engine may be eliminated if sufficient internal cooling is provided). The energy of the coolant, that would otherwise typically be lost to external cooling jackets, is converted to gas pressure in the working chamber. Therefore, some of this energy is recuperated, as more work is done during the expansion (power) stroke.

Some embodiments also include a heat exchanger in the path of the engine exhaust to harness energy associated with exhaust, including from the phase change of the evaporative liquid. Alternatively or in addition, the engine further includes a second heat engine, the second heat engine converting energy from exhaust heat into additional shaft work.

In some embodiments, the conduit is in communication with a network of channels in the seals of the engine.

Another embodiment teaches an improved internal combustion engine of the type using gaps between surfaces of a moving member and of a housing of the engine, the engine having a working chamber and an exhaust, wherein the improvement includes: a source of a pressurized evaporative liquid; and a conduit defining a passageway of the evaporative liquid to at least one of the gaps, so that the evaporative liquid comes into contact with the surfaces so as to form a seal and at least a part of the evaporative liquid undergoes a phase change to a gas when exposed to heat by the surfaces, the gas escaping into the working chamber of the engine and thereafter becoming a part of the engine exhaust, and heat is removed from the engine as a result of the phase change.

Yet another embodiment teaches an improved rotor used in internal combustion engine of rotary type, the rotor having an axis of rotation, wherein the improvement includes: a plurality of radially disposed ribs (518) coupling a radial surface of the rotor to a central portion of the rotor, the ribs facilitating flow of cooling fluid in an axial direction through the rotor and providing structural integrity of the rotor. The cooling fluid may include, for example, air, or an air-fuel mixture, or air mixed with an evaporative liquid.

Some embodiments further include at least one plate (507 or 508) generally perpendicular to the axis of the rotor and mounted so as to channel axial flow of cooling fluid over the ribs to at least one opening between the ribs where the plate is not located. This can direct the cooling fluid toward a heat-exchanging region of the rotor. This may include, for example, cooling fins (506) disposed in the at least one opening and coupled to the radial surface of the rotor so as to facilitate heat transfer from the rotor at least one plate (507 or 508) generally perpendicular to the axis of the rotor and mounted so as to channel axial flow of air over the ribs only to at least one opening between the ribs where the plate is not located; and a set of cooling fins (506) disposed in the at least one opening so as to facilitate heat transfer from the rotor.

Some embodiments further include at least one block of thermally conductive foam (504) disposed between adjacent ribs of the rotor so as to increase heat exchange between the rotor and the cooling air.

In another embodiment, the invention provides an improved engine of the type including a cycloidal rotor having N lobes and a housing having a corresponding set of N+1 lobe-receiving regions for successively receiving the lobes as the rotor rotates about an axis relative to the housing, the housing having (i) a pair of covers axially disposed on first and second sides of the rotor, and (ii) a peak disposed between each pair of adjacent lobe-receiving regions, at least one working chamber being formed in a space between the rotor and the housing. In this embodiment, the improvement includes an intake port and an exhaust port, each port being formed in the same one of the covers or in a different one of the covers. The exhaust port opens prior to the intake port so as to scavenge burnt gas from the working chamber and to fill the chamber with fresh medium, so as to provide 2-stroke operation of the engine. Optionally a pressurized fluid medium is supplied to the intake port. In a further related embodiment, the ports are asymmetrically located.

In some embodiments, the ports are asymmetrically located on different covers, and in some embodiments, the ports are asymmetrically located on the same cover.

In still another embodiment a rotor assembly of a rotary machine includes a rotor body (1201) having a radial face; and a sleeve (1202) disposed circumferentially over the radial face; wherein the sleeve has a tongue (1203) projecting radially inward and the rotor body has a corresponding radially indented groove in which to receive the tongue.

Some such embodiments further includes a side seal assembly, disposed on the radial face of the rotor body, the side seal assembly having a primary seal (1403) and a compressible secondary seal (1404), the secondary seal being in contact with the primary seal and disposed in a groove of the rotor body. Also, some embodiments include a peripheral corner cut-out for correspondingly shaped side seal. Also, some embodiments include an intake port for allowing fresh medium into the working chamber and an exhaust port for allowing burnt gasses to exit from working chamber.

Still another embodiments includes an improved rotary engine of the type having a rotor having N lobes, an intake port for intake of a working medium, an exhaust port, and a housing with respect to which the rotor is mounted for rotational motion relative to the housing, the housing having N+1 lobe-receiving regions and (i) a peak disposed between each pair of adjacent N+1 lobe-receiving regions and (ii) a pair of sides, the N+1 lobe-receiving regions further configured in relation to the rotor to successively receive the N lobes as the rotor rotates relative to the housing, so as to establish chambers, a chamber associated with each one of the N+1 lobe-receiving regions, wherein at least one chamber of the established chambers is configured to handle, in succession, intake, compression of the working medium and injection of fuel, combustion, expansion, and exhaust phases, wherein the improvement includes a recess in the housing associated with each chamber wherein combustion occurs, the recess asymmetrically shaped so as to create a vortex in the working medium in the course of compression and injection of fuel. In some such embodiments, the recess has an elongated, drop-like shape that accommodates a shape and volume associated with a plume of fuel injected therein.

BRIEF DESCRIPTION OF THE DRAWINGS

The foregoing features of embodiments will be more readily understood by reference to the following detailed description, taken with reference to the accompanying drawings, in which:

FIGS. 2A-2E schematically illustrate features of the engine, based on X-engine geometry and cycle that could be used in the above CHP.

FIGS. 5A-5E schematically illustrates a rotor configured to implement supercharging and additional cooling;

FIG. 7A-7F schematically illustrate design of "U-cup" face seal;

FIG. 8 schematically illustrates a projection of surface area of the fluid-pressure receiving surface of a seal onto the axial contact surface of the seal;

FIG. 9 schematically illustrates potential improvement to design of "U-cup" by incorporating additional springs assisting the U-cup seal to remain the contact with the rotor;

FIGS. 10A-10B schematically illustrate an embodiment of a "plate seal;"

FIGS. 12A-12C schematically illustrate an embodiment of a sleeved rotor;

FIGS. 14A-14L schematically illustrate additional embodiments of seals;

FIGS. 15-16 schematically illustrate an embodiment of a combustion chamber;

FIGS. 17A-17F schematically illustrate an embodiment of a method of producing a "gradient-property" material rotor.

DETAILED DESCRIPTION OF SPECIFIC EMBODIMENTS

Figure 1A:
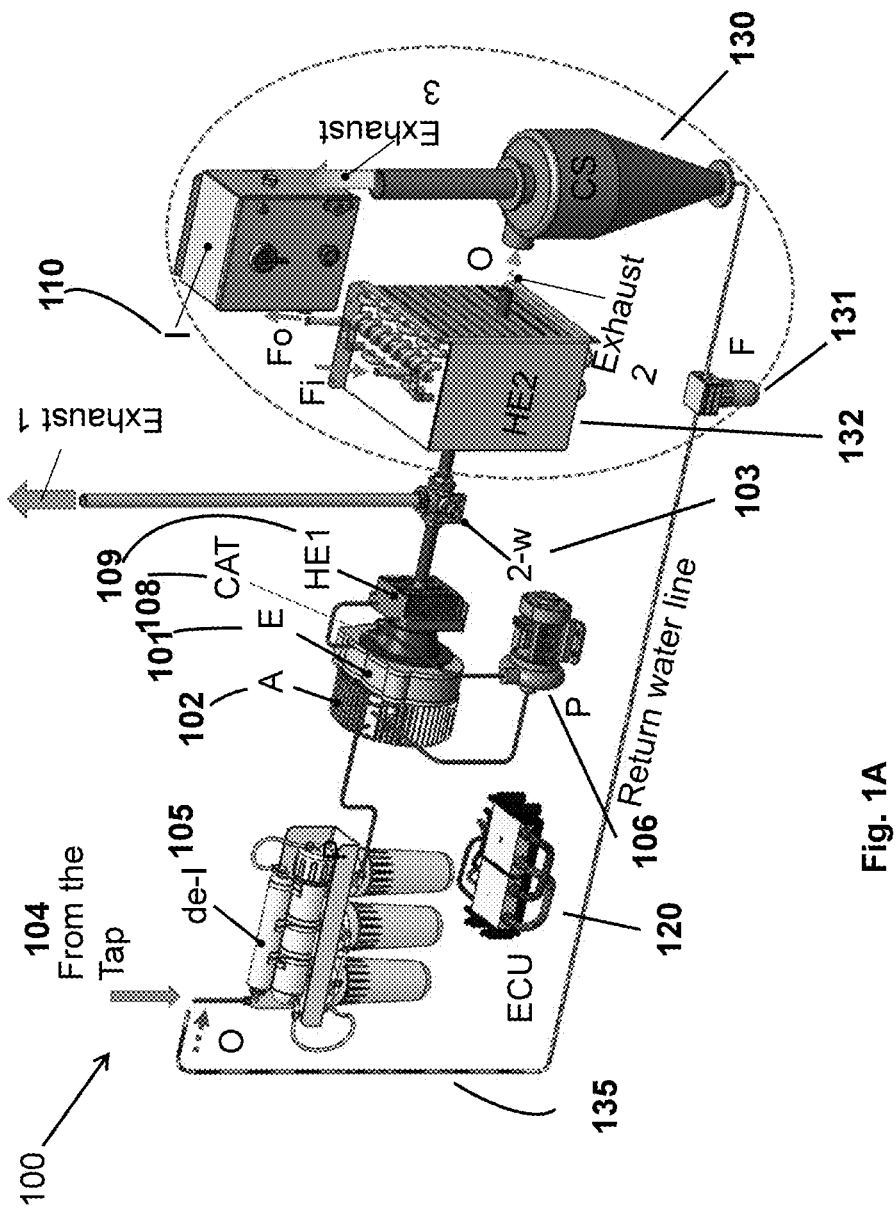
FIG. 1A schematically illustrates features of very high efficiency combined heat and power system (CHP)

Various embodiments describe modifications to X-engines, which would utilize a dedicated chamber to implement bottoming Rankine cycle as well as additional improvements in sealing, combustion efficiency—all contributing to high efficiency.

Definitions. As used in this description and the accompanying claims, the following terms shall have the meanings indicated, unless the context otherwise requires:

A "rotary machine" is a machine selected from the group consisting of a rotary engine, a rotary compressor, a rotary pump, and a rotary expander.

A "peripheral corner cut-out" of a rotor is a cut-out, from the rotor, located at a radial extremity of the rotor, so as to cause a reduction in axial extent of the radial surface of the rotor.

A "flexible, secondary seal" is seal made of flexible or compressible materials such as polymers or various thin-cross-section steels, such as O-rings, X-rings, E-rings, C-rings and others; the main feature of these flexible secondary seals is provide a simultaneous contact between the rotor and primary seals without impeding the motion of the primary seal.

An "evaporative liquid" is a liquid undergoes a phase change to a gas at temperatures and pressures experienced in the housing of an internal combustion engine. In this context, water is an "evaporative liquid," whereas lubricating oil is not an evaporative liquid. An "X-engine" is an engine, embodiments of which are described in U.S. Pat. No. 8,523,546, which is incorporated herein by reference in its entirety. An X-engine operates under a High Efficiency Hybrid Cycle (HEHC).

A "High Efficiency Hybrid Cycle" (or "HEHC") is a cycle as described in U.S. Pat. No. 8,523,546, and which may be executed by an engine, such as an X-engine for example.

A "medium" is either fresh air or air/fuel mixture that enters the working chamber of engine during intake stroke.

A "powder materials" may contain ceramics, graphite, aluminum, magnesium, titanium, binder, and other materials that are beneficial to rotor of rotary machine, from the standpoint of weight, strength, wear, friction, thermal conductivity, coefficient of thermal expansion, etc.

A "compacting and sintering processes" comprises a family of production technologies, which process a feedstock in powder form to manufacture components of various types. These production technologies generally involve all or most of the following process steps:

a). Forming of the mixed powder into a compact (the dominant consolidation process involves pressing in a rigid toolset, comprising a die, punches and, possibly, mandrels or core rods. However, there are several other consolidation processes that are used in niche applications.

b). Sintering of the compact to enhance integrity and strength. This process step involves heating of the material, usually in a protective atmosphere, to a temperature that is below the melting point of the major constituent. In some cases, a minor constituent can form a liquid phase at sintering temperature; such cases are described as liquid phase sintering. The mechanisms involved in solid phase and liquid phase sintering are discussed briefly in a later section.

U.S. published patent application no. 2014/0209056, published Jul. 31, 2014 (patent application Ser. No. 14/163,654, filed on Jan. 24, 2014), incorporated herein by reference in its entirety, describes X-engine geometry with dedicated special chambers that could be used for pumping, compression or other purposes, while remaining chamber(s) of the engine are used for conventional internal engine combustion processes.

U.S. Pat. No. 8,523,546, incorporated herein by reference in its entirety, describes rotary engines, which we will call "X-engines", operating under High Efficiency Hybrid Cycle (HEHC). While the HEHC cycle is inherently more efficient, and attempts to recover as much energy as possible from the exhaust by over-expansion, there remains, nonetheless, significant heat energy in the exhaust and cooling.

The present application relates to improvements in rotors and related seals and components for use in any of (1) an epitrochoidal rotary engine of the general type disclosed in U.S. Pat. Nos. 8,863,724 and 8,523,546, (2) a rotary compressor, or (3) a rotary pump. FIG. 2 shows a typical embodiment of the type to which the improvements shown herein are applicable. U.S. Pat. Nos. 8,863,724 and 8,523,546 are hereby incorporated herein by reference in their entirety.

X Engine Operating Cycle

The HEHC X engines uses a four-stroke cycle incorporating intake, compression, combustion and expansion, and exhaust. Each of these strokes occurs sequentially within each of the two engine chambers. The engine is ported, allowing full 4-stroke operation without the use of poppet valves. Air and fuel are routed through the rotor to enter or exit a given combustion chamber. Asymmetry in the location of intake and exhaust port causes over-expansion. Constant-volume combustion is achieved by trapping the volume of air and fuel within each of the isolated combustion chambers for a prolonged period while the rotor is spinning, and the arc of the top of the rotor aligns with the arc of the housing. Thus, the unique aspects of the engine geometry allow the engine to embody the HEHC cycle.

The efficiency improvement is grounded in thermodynamics, through integrating: 1) a highly optimized thermodynamic cycle dubbed the High Efficiency Hybrid Cycle (HEHC), described in LiquidPiston's U.S. Pat. No. 8,523,546, which is incorporated herein in its entirety; the cycle combines high compression ratio, constant-volume combustion, and over-expansion; 2) the engine is thermally insulated externally, and is cooled using internal (in-cylinder) Water Injection (WI) (or more generally, evaporative fluid injection); as this water turns to steam (evaporative fluid turns to gas), it builds pressure in the chamber allowing partial recuperation of cooling losses while lowering gas and cylinder temperature; 3) both the heat from exhaust as well as the heat from internal cooling by water/steam are recuperated through a Bottoming Rankine cycle integral to the base engine.

In the X engine, the Water Injection (WI) used for internal cooling can be injected or inserted into the cylinder at the sealing points of the engine, thereby improving sealing, and potentially eliminating or reducing the need for oil lubrication. Without oil, the engine can run hotter, emissions will be better, and there will be fewer maintenance requirements.

FIG. 1A illustrates an embodiment of a very high efficiency combined heat and power system (CHP) 100. As an example, a 1 kWe system will be used throughout but the concept is equally applicable for much larger systems as well.

A rotary X-engine, "E", operating on any suitable fuel— as an example, on Natural Gas (NG)—is coupled to an alternator "A", providing 1 kW electrical power to the grid Interconnect/power electronics box "I". The engine contains 3 chambers, two of which, called $E_{HEHC}$ chambers, fire on natural gas, and the third, called $E_{STEAM}$, is used for a Rankine (steam) bottoming cycle (see FIG. 2a for definition of chambers and FIG. 1B for system's energy balance). Corresponding injectors inject NG in the $E_{HEHC}$ chambers (or any other fuels, as required by design) and a steam injector injects steam in the $E_{STEAM}$ chamber. An Electronic Control Unit "ECU" controls the engine E fuel, alternator A, and 2-way valve "2-w". Water injection will be used for cooling, lubrication and for internal waste heat recovery. Water is supplied from the residence tap to a de-ionizer "de-I", it then cools alternator "A" and flows into high-pressure pump "P" and then into small heat exchanger "HE1", where heat from exhaust gasses are transferred to this water converting it into superheated steam, which is further injected into the bottoming cycle chamber of the engine $E_{STEAM}$. In a connected circuit, relatively cold water is fed directly to the engine seals to cool the engine's rotor and other components; this water turns to steam within the chamber and the energy otherwise lost to coolant is partial recuperated. After combustion, the exhaust passes through a catalytic converter "CAT" 108 where it is scrubbed. The burnt air exits into "HE1" and then, if residence heat is not needed, it is discarded through valve "2-w" into the atmosphere. If heat is needed, the exhaust is instead directed to the residence heat exchanger "HE2" 132. To minimize external heat loss, the engine, alternator, catalytic converter, and HE1 will be fully thermally insulated, so that any cooling happens only through the water.

Optionally, to lower operating cost, albeit at added capital cost, the system water can be recovered, for example by a cyclone separator "CS", in which case the exhaust stream is cooled to the point of water condensation and separated from the gas. Water from "CS" flows through filter "F" and is returned to "de-I" via return water line 135. This option eliminates the requirement to connect to an external water supply, but includes additional components. The components shown within the ellipse in FIG. 1A are optional as well.

Below, we'll describe how the Engine (E) operates with internal water cooling and bottoming cycle and interacts with the rest of components of the system.

WI/Cooling

Typically, engines are cooled externally with coolant flowing through a water jacket; about one third of fuel energy is thus converted into the low grade heat, rejected to the environment. In this embodiment, we implement a different strategy to internally cool the engine. Water injected during the intake or compression stroke has the effect of cooling the gas, which pulls the compression curve of the PV diagram downwards (increasing efficiency). Water injected during combustion or expansion will also cool the charge, reducing peak pressures and temperature. This decreases NOx emissions, and can also increase the knock limit allowing higher compression ratios (allowing increased thermal efficiency). Uniquely to the X-engine architecture, water injection may be done directly at the interface between seals and rotor, and/or seals and covers; such water would cool both the seals and the rotor, or seals and the cover, while also turning to steam and having a lubricating effect. Injected water turns to steam (cooling engine from the inside), but the steam will increase the chamber pressure (volume occupied by steam is ~1400× of liquid water at ambient conditions), while the overall temperature is reduced. The effect is increased power output, while lowering combustion temperatures that also reduces NOx emissions. Further, over-expansion of gasses allows the engine to reap more benefit from the steam generated, capturing more energy that would otherwise be lost to coolant. This also opens the door for an alternative lubrication strategy—lubricating by water/steam vapor: for example, by using AlMgB14 coating which is super hard and has a very low friction coefficient (0.02) when wet.

Bottoming Cycle

Bottoming cycles, or combined cycles, are commonly used strategies especially for larger power plant systems. A topping cycle (typically a turbine engine or internal combustion engine) typically rejects approximately one third of the heat available in fuel in the exhaust. While the HEHC cycle is inherently more efficient, and attempts to convert as much energy as possible within the 4-stroke cycle, there remains, nonetheless, significant energy in the exhaust. As described above, in the proposed system, the thermally insulated engine is cooled by water from within the chamber, i.e., not from coolant channels outside the chambers but by direct contact of water with a rotor and/or housing. The water, in the form of steam, is then mixed with the exhaust—so essentially all of the heat that is not used for mechanical shaft work, e.g. what is normally lost to "cooling" or "heat transfer" is also mixed with "Exhaust heat" and is made available for a bottoming cycle. Typically, a bottoming cycle is implemented by a second heat engine that is able to utilize the rejected heat from the topping cycle, and contribute additional mechanical energy to the shaft, thereby boosting overall efficiency. It is not uncommon for a large natural (MW scale) gas power plant to achieve 40% efficiency in its topping cycle, and then 50-60% overall efficiency through the combined cycle. The novel feature of the proposed engine is that all "cooling" losses are made available in addition to heat of exhaust for a bottoming cycle. The invention, proposed herein, is based on the 3-chambered 'X' engine, where 2 chambers do the Topping HEHC cycle, and the $3^{rd}$ chamber is used as an expander for a Bottoming Rankine cycle. Other than steam injector, no new hardware is necessary to implement the proposed engine. The result is incredibly compact, cost effective, and the entire combined cycle is achieved with only a few moving parts (plus balance of plant).

To achieve high brake efficiency, the engine recovers energy from both the cooling and exhausts streams:

Two of the 3 engine's chambers operate on HEHC. Exhaust from the engine is run through a heat exchanger producing superheated steam. The $3^{rd}$ chamber of the engine uses a Rankine bottoming cycle, with steam injected at TDC.

In the proposed embodiment of the engine, water/steam is used as a cooling, sealing, lubrication, and heat recovery mechanism. Only a small quantity of water is necessary for rotor cooling purposes (~30% the mass of intake air), and oil may be completely eliminated from the system. Engine operating temperature may be increased up to 400 C since no oil film is required (instead of 180 C which is typical with oil film).

Shown in FIG. 2 a) is the 3-chamber X-engine with front cover removed. It comprises housing (201), cover plates (202) and (206, FIG. 2 b)), a rotor (203), three apex seals (204) and two face seals (205). An intake air charge (235) flows into the chamber through the shaft (233) and intake port (232). The working chamber spaces are delimited by rotor, housing and two cover plates. In the proposed topping cycle, two of the working chambers—called "$E_{HEHC}$"—will be configured as firing chambers that execute the 2- or 4-stroke HEHC-SI cycle. The third chamber, called "$E_{STEAM}$", will be dedicated to bottoming cycle (see FIG. 2 a)).

Figure 2B:
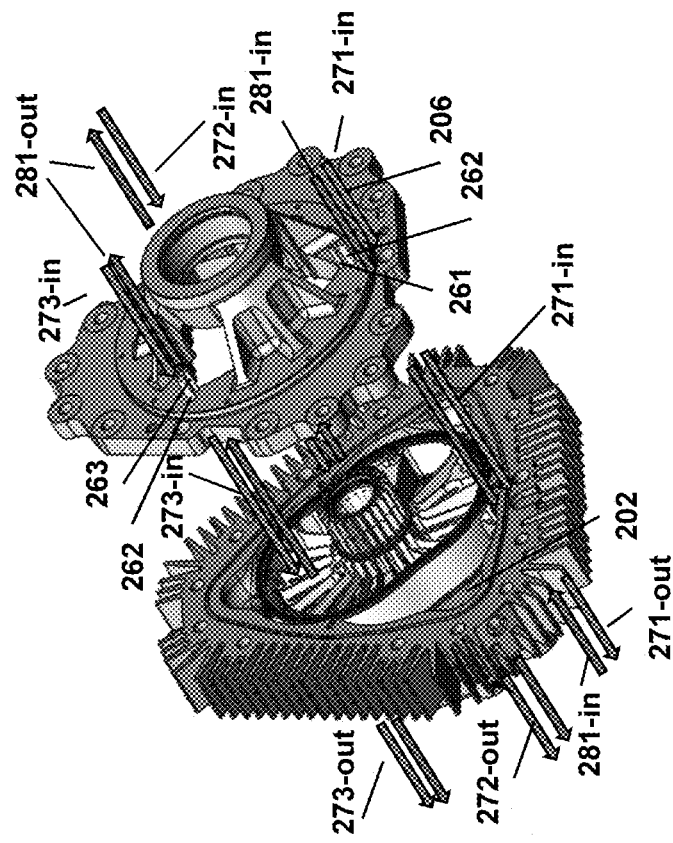
Figure 2A:
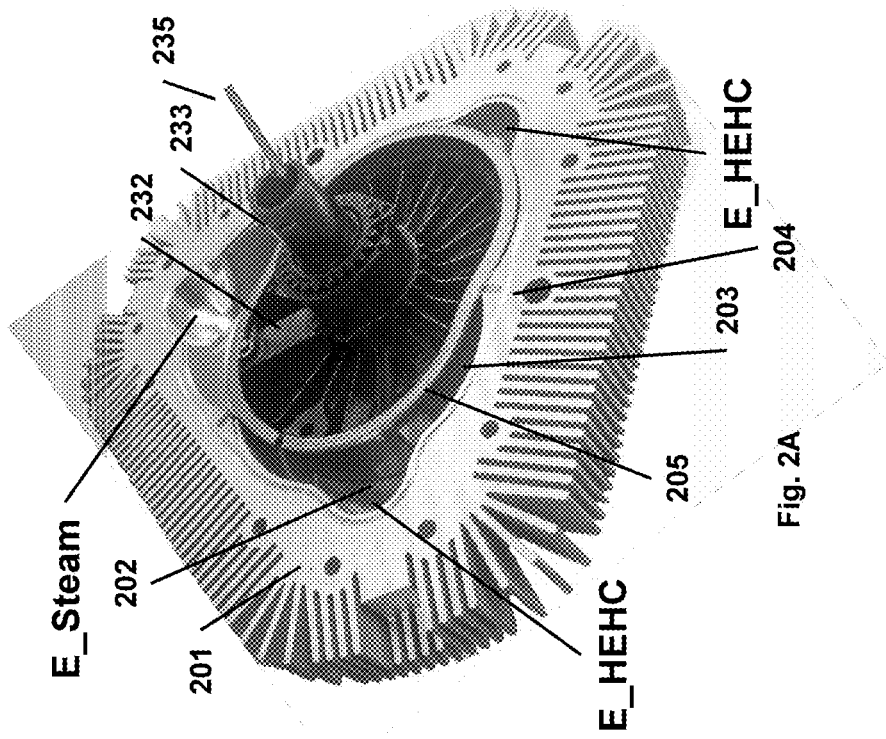

A thermal barrier coating is used on internal surfaces of the housing and covers or thermal insulation around the housing (not shown) to keep most of the combustion heat in. There is no contact of housing with any moving parts, excepts the apex seal, so, the housing does not to be cooled if we provide a dedicated cooling to apex seals. The only components that need to be cooled are the rotor and all the seals—these are cooled internally by water pumped through the engine seals. The flow of water is shown in FIG. 2b). The arrows (271-in and 271-out, 272-in and 272-out, 273-in and 273-out) show the flow of water through the metering orifices (262) in the cover plate (206) in the axial direction through each of the apex seal (204); these flows exit on the other side of the engine through cover plate (202, FIG. 2a)). FIG. 2e) provides detail of the flow (271) through the seal (204). The apex seal are described in application Ser. No. 13/434,827, filed on Mar. 29, 2012, hereby incorporated herein by reference in their entirety (and also in U.S. Pat. No. 8,523,546), as well as below. They are made out of two halves (241 and 242), energized by spring (244); these two halves slide with respect to each other as shown with cross-hatched arrows and allow water, flowing through the channel (243) to leak through this sliding interface onto the rotor (203). A second version of apex seal is shown in FIG. 2 d). It has spring (244) energized pad (245) and ceramic roller (246). Water flows through the channel in the pad and, the roller being drags it and spreads it onto the rotor. Because the apex seals are stationary within the housing, the water flows continuously through them.

The water flow onto the face seals (205) is three dimensional, shown in FIGS. 2.b and 2.c. A water stream (281-in) enters the metering orifice (261) in the cover plate (206) in the axial direction; it gets into a groove on the contact surface of the U-cup face seal (205, FIG. 2 c)). U-cup face seal is discussed in FIGS. 8 and 13 below. From here, the flow (281-in) splits into two directions, as shown by dashed arrows. The water flows in the groove and exits (281-out) in two places from the same cover plate—note how flow arrows change the direction. Due to unique geometry of X-engines, the groove in the face seal (205) is always and simultaneously exposed to both entrance (262) and exit (263) orifices, thus, allowing continuous water flows through face seal/cover interfaces.

Figure 1B:
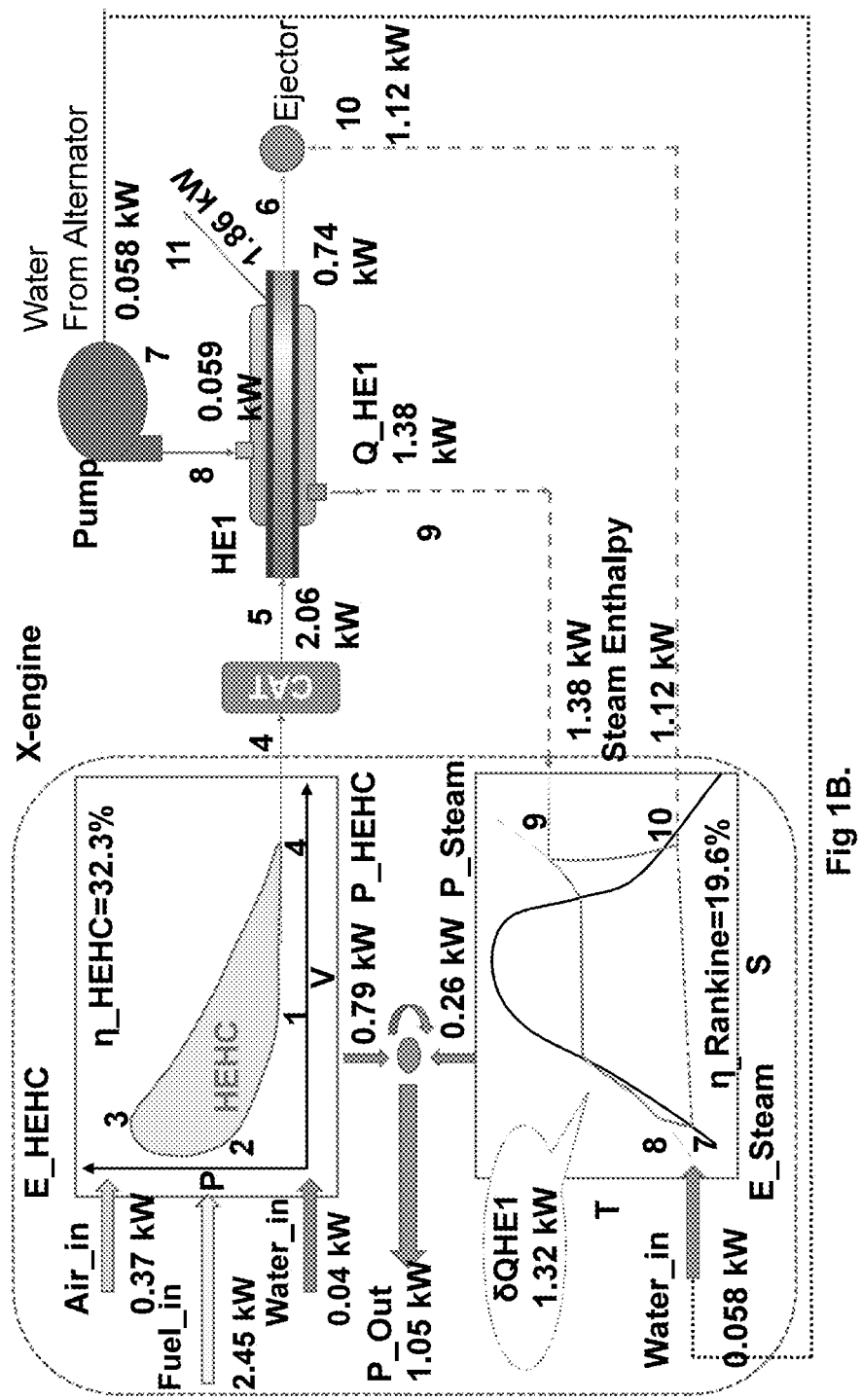
FIG. 1B schematically illustrates thermodynamic benefits of a CHP system of FIG. 1A.

The water, as was said above not only cools the seals but also aid in sealing itself. The sealing is not perfect, however; some water leaks into the chambers and this constitutes the water injection as described above. Also, this water flowing through hot apex seal/rotor and face seal/covers interfaces forms water/steam mixture, which, partially, evaporates and superheats on the walls of the rotor and cover plates. This water/steam mixture has six distinct functions:

1) the superheated steam when expended, generates additional power at the expense of the heat extracted from the rotor and cover plates, 2) efficiency is increased, as the result of partial waste heat recovery—this heat is normally lost to the environment by water cooling in the engine jacket, 3) cooling of both the rotor and the cover plates takes place by evaporating water, 4) to lubricate the interface between rotor (piston) and cylinder, 5) to seal the rotor (piston), and 6) to create a larger pool of high quality energy, as steam entering the chambers would, eventually, be exhausted and combined with engine exhaust Referring to FIG. 1B: thermodynamics of the cylinder (points 1-4, inside of HEHC cycle diagram within the $E_{\_HEHC}$ part of the engine) are modeled with a 1-D GT-Power simulation code for a small, 1 kWe engine. Exhaust gases and water vapor exit the chamber at point (4) and enter into a Catalytic Converter, (CAT) where any unburned fuel is further oxidized and exit with parameters (5). The gas/vapor mixture then enters into Heat Exchanger #1 (HE1) and exits it at point (6), giving off heat to the water that enters the second loop of HE1. After HE1, combusted gas/vapor mixture enters into Ejector, where it further mixes with the low pressure steam exiting $E_{\_STEAM}$ at point (10).

Water, supplied from the tap and de-ionized in "de-I" (FIG. 1A) enters and cools the alternator and enters the Pump at point (7, FIG. 1B). Water exits the Pump at point (8, FIG. 1B), where, as described above it enters HE1. Water exits HE1 at point (9, FIG. 1B) as superheated steam and enters $E_{\_STEAM}$, where it expands to point (10, FIG. 1B) and enters Ejector where it mixes with exhausts from $E_{HEHC}$, as was described above. The exhaust gasses & steam are further directed to a 2-way valve. The $E_{\_STEAM}$ chamber of the engine therefore executes a bottoming cycle, recovering some of the waste heat that is otherwise thrown away by the engine's cooling and exhaust.

Thermodynamic Modeling Analysis

The engine powers an off-the-shelf commercial alternator (assumed 96% efficient, per the FOA). Efficiency includes the base HEHC engine, as well as an additional bottoming cycle component. The HEHC component efficiency (with WI) is:

$$\eta_{Engine}=\eta_{comb}\cdot\eta_{ind}\cdot\eta_m\cdot\alpha_{WI}=0.95*0.38*0.875*1.052=32.3\%.$$

The indicated efficiency of the engine, $\eta_{ind}$, is reduced by combustion inefficiency, $\eta_{comb}$ and mechanical inefficiency, $\eta_m$. We assume a conservative estimate for increase in BTE (1.052) due to Water Injection ($\alpha_{WI}$).

The bottoming Rankine cycle (bRc) brake efficiency $\eta_{Rankine}$=19.6%. Note that about 79% of exhaust/cooling heat is available as input to the Rankine cycle.

The X-engine & Bottoming cycle (HEHC together with bRc) brake efficiency is:

$$\eta_{Engine+BC}=\eta_{Engine}+(1-\eta_{Engine})\cdot\alpha_{BC\_AVAL}\cdot\eta_{bRc}=0.323+(1-0.323)*0.795*0.196=42.9\%.$$

Finally, overall electric genset efficiency (including alternator) is $\eta_{generator}$=42.9*0.96=41.2%;

The HEHC cycle will be enhanced with water injection, eliminating external cooling to the engine and alternator plus providing a simple means to an efficient "bottoming cycle". The presence of water and steam is parlayed into both environmental and reliability benefits. The use of oil may be completely eliminated in favor of steam lubrication. The internal cooling combined with external insulation keeps the heat within the system while simultaneously ensuring quiet operation.

To estimate the electrical efficiency of the proposed CHP system, analysis was performed with two sets of assumptions: conservative and aggressive. The assumptions that were used for 1-D model of $E_{\_HEHC}$ and results obtained are as follows [Brake Thermal Efficiency=(BTE)]:

TABLE 1

Conservative and aggressive analysis of engine performance.

| Assumptions | Conservative | Aggressive |
|---|---|---|
| BTE increase effect due to WI - internal water cooling/steam | 5.2% | 20.8% |
| Internal (charge) cooling losses (Per our method of water injection - most of the cooling will occur by heat transfer from the rotor to water. Some water will evaporate and escape into the chamber, causing charge cooling) | 28% | 21% |
| Leakage effective orifice area | 0.3 mm2 | 0.2 mm2 |
| Compression Ratio (CR) | 14:1 | 18:1 |
| RESULTS | | |
| Amount of fuel supplied to CHP | 2.45 kW | 2.35 kW |
| BTE of E_HEHC (no WI) | 31.1% | 34.6% |
| BTE of E_HEHC (with WI) | 32.3% | 40.8% |
| BTE electric (HEHC, with WI, with bottoming cycle, with alternator) | 41.2% | 47.7% |

Details of the Model:

The 4 strokes of the engine processes ($E_{\_HEHC}$) are modeled in a GT-Power (1-D) simulation of the X engine. The model has appropriate geometry information, including volume, surface area, port areas and other features of the X-Mini engine.

Air is inducted through the shaft and intake port.

Air is compressed (1→2). Heat transfer (Woschni type model) and leakage (blowby) is modeled as flow through an orifice exiting the chamber. Part of the leakage is to adjacent chambers, and part is to the atmosphere.

NG is injected at any time after intake port closing.

The Air/fuel is combusted from 2→3 using a Wiebe function to emulate time-phased heat release. 95% combustion efficiency is assumed. The volume during this phase is approximately constant.

The combustion products are expanded 3→4, while again taking into account leakage and heat transfer. The over-expansion continues until atmospheric pressure is reached.

Figure 1C:
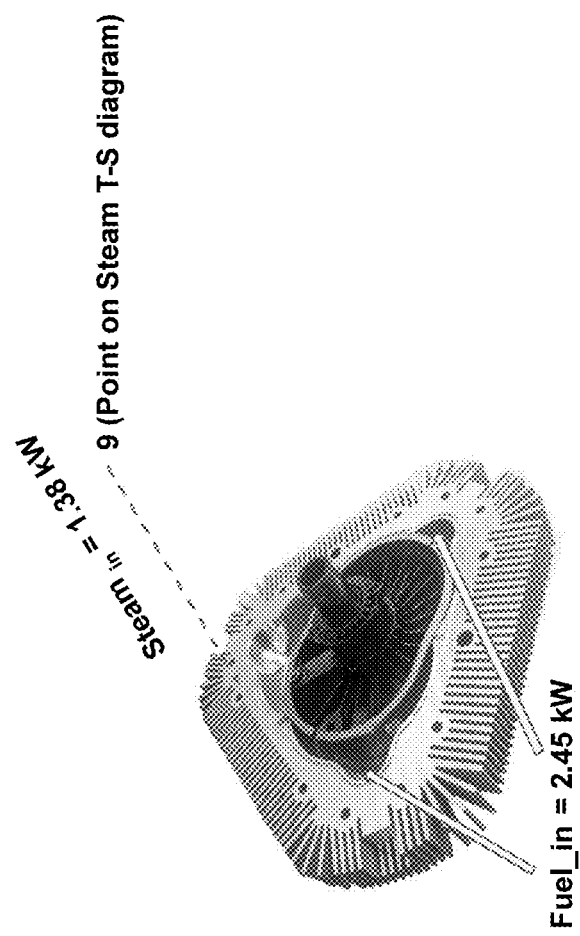
FIG. 1C illustrates an engine at point 9 of the T-S diagram of FIG. 1B.

The combustion products are exhausted through an exhaust port in the rotor, through windows in the cover and enter Catalytic Converter (CAT, FIGS. 1 and 2).

In CAT, the remaining fuel is further oxidized and exhaust temperature is increased.

From CAT, the exhausts are directed into a Heat Exchanger, HE1

It is challenging to model water and Steam in the GT-Power simulation. In the analysis presented here, we model HEHC (without water injection), but we assume 5% (conservative) or 22% (aggressive) gains in efficiency are possible based on literature research.

The rest of the calculations were performed using water/steam tables. For heat exchange HE1:

$$M_E(h_6-h_5)=M_w(h_9-h_8)=Q_{HE1}=1.32 \text{ kW-heat exchanged in the } HE1 \quad (1)$$

where:

$M_E$ is the mass of exhaust gasses that exits $E_{\_HEHC}$—(from 1D simulation of $E_{\_HEHC}$)

$h_1$-$h_6$ are enthalpies of gas at points 1 through 6 (from 1D simulation)

Mass of water entering the HE1—can be found from eq. (1):

$M_w$=0.0004 kg/sec is the water flow $h_7$-$h_{10}$ are enthalpies of water/steam at points 7 through 10.

| T [C.] | P [bar] | h [kJ/Kg · K] | S [kJ/kg · K] | Vapour fraction | Comments |
|---|---|---|---|---|---|
| 7 | 32 | 3.5 | 134.4 | 0.5 | 0.0 | Before pump |
| 8 | 134.4 | 40 | 138.1 | 0.5 | 0.0 | After pump |
| 9 | 400.0 | 40 | 3214.4 | 6.8 | 1.0 | Superheated steam |
| 10' | 99.6 | 1 | 2455.9 | 6.8 | 0.9 | Isentropic Expansion |
| 10 | 99.6 | 1 | 2607.6 | 7.2 | 1.0 | Non-Isentropic expansion: isentropic efficiency = 70% |

The $h_7$—gives condition of water exiting alternator (water temperature rise in alternator is minimal—12 deg. C.). Once Pump pressure is chosen (40 bar assumed)—all other points of $E_{STEAM}$ could be found from the water/steam tables.

All the remaining parameters below are shown for "conservative" assumptions to save space:

$Q_{in}$=2.45 kW (lower heating value of fuel input, given as parameter)

$$W_{OUT} = W_{HEHC} + W_{STEAM} - W_{PUMP}$$
$$= 0.792 \text{ kW} + 0.2604 \text{ kW} - 0.0016 \text{ kW} = 1.05 \text{ kW}$$

$W_{HEHC\_Indicated}$=0.931 kW (net indicated work from GT-Power model of HEHC engine)

$$\eta_{ind} = \frac{0.931 \text{ kW}}{2.45 \text{ kW}}; \quad \eta_{ind} = 38\%$$

Efficiency "cascade" for $E_{HEHC}$ engine is:

$\eta_{HEHC} = \eta_{comb} \cdot \eta_{ind} \cdot \eta_{WI} \cdot \eta_m = 0.95 \cdot 0.38 \cdot 1.052 \cdot 0.85 = 32.3\%$ —brake efficiency ($\eta_{comb}$=95% —assumed combustion efficiency; $\eta_{ind}$=38% —1-d simulation result from GT-Power with "conservative" assumptions; $\eta_m$=85% —measured at LPI (corresponds to 5% BTE total frictional losses); $\eta_{WI}$=1.052—Conservative assumption for efficiency gain from using WI);

$W_S = M_w (h_{10}-h_9)\eta_{ise\_S}$=0.2604 kW—the work produced by steam in $E_{Steam}$ assuming $\eta_{ise\_S}$=0.7 (Typically, $\eta_{ise\_S}$ varies from 65% to 85%);

$W_P = M_w (h_8-h_7)\eta_{ise\_p}$=0.0016 kW—the work required to drive the Pump $$\text{Thus, } \eta_{Rankine} = \frac{Ws - Wp}{Q_{HE1}} = \frac{0.2588}{1.32}$$

$\eta_{Rankine} = 19.6\%$

The complete X-engine efficiency, with WI & Rankine Bottoming is, then:

$\eta_{X\text{-}engine} = W_{OUT}/Q_{in}$=1.05 kW/2.45 kW; $\eta_{X\text{-}engine}$=42.9%

Considering 96% alternator efficiency, we get the total generator efficiency:

$\eta_{generator} = \eta_{X\text{-}engine} \times \eta_{alt}$=42.9%×96%;
$\eta_{generator}$=41.2%;

Repeating (and skipping details) for aggressive scenario gives us $\eta_{generator}$=47.7%

Therefore, for both, conservative and aggressive scenarios the efficiency of proposed generator will exceed the required 40%, while providing 1 kWe and slightly more than 1 kW of usable heat at temperatures >100° C.

It should be noted that gas injectors could be used instead of steam injectors, if it is beneficial to use compressed air or Nitrogen, or high pressure liquid air or Nitrogen.

Figure 3A:
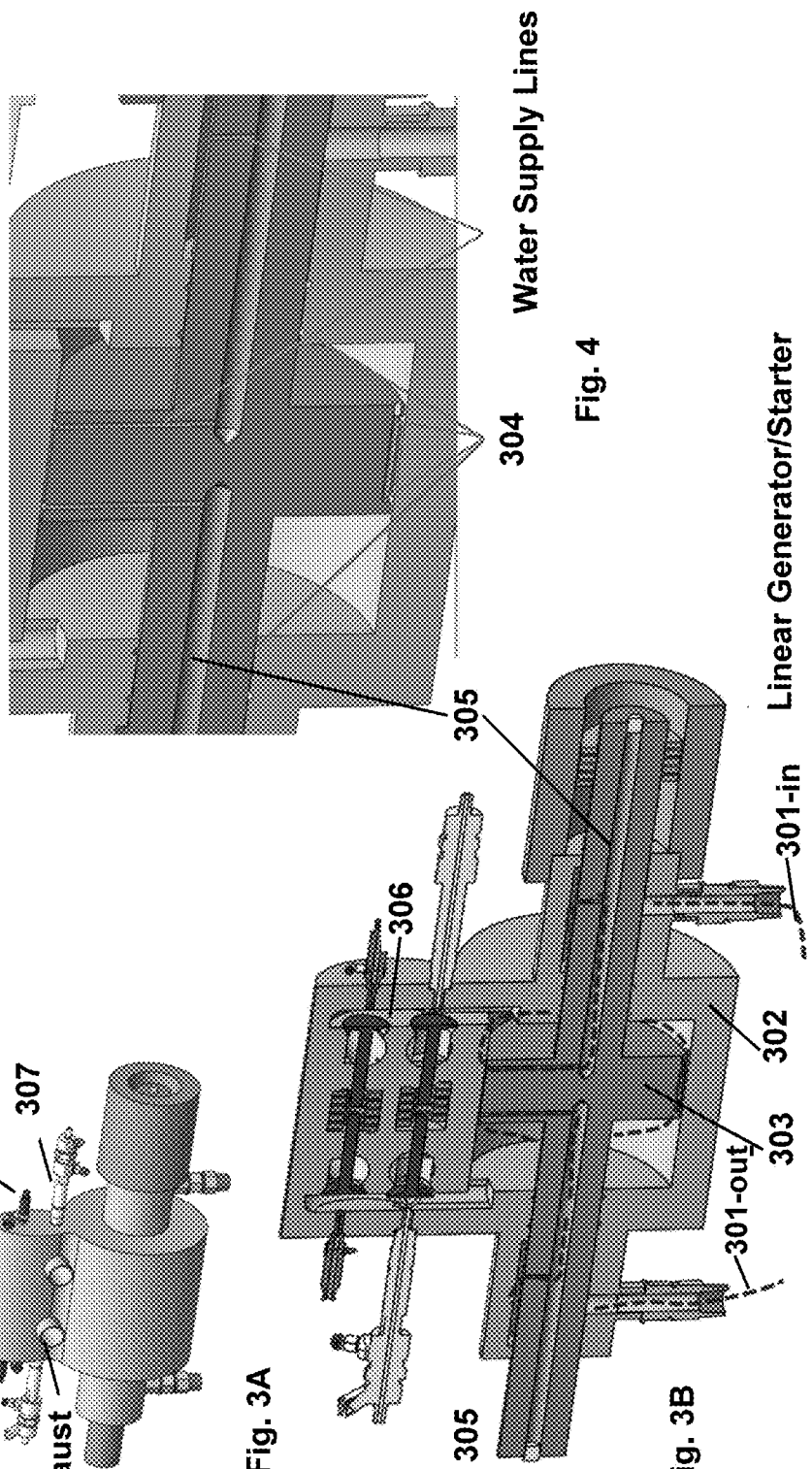
FIGS. 3A-3B schematically illustrate features of the piston engine that could be used in the above CHP system.
Figure 3B:
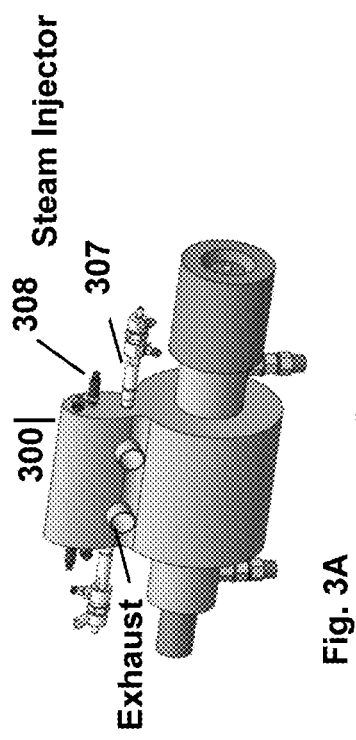
Figure 4:
FIG. 4 schematically illustrate features of the piston engine that could be used in the above CHP system.

In another embodiment of the proposed invention, shown in FIG. 3A, FIG. 3B and FIG. 4, a piston configuration of internal combustion engine 300 is utilized; only a single piston 303, forming 2-cylinder engine 300 is shown, but it is equally suitable for multi-piston geometries.

FIG. 3a) provides general view of the engine 300; FIG. 3b) is a cross-section showing water passing through the housing into the piston and through grooves. FIG. 4 is a cross-section showing grooves 304 in both piston and housing as well as "supply line" 305. In the embodiment shown, water is supplied through conduits in the moving member (piston 303), but in alternate embodiments (not shown), water may be supplied directly to the sealing surface by a conduit in the housing.

Combustion chambers 306 with valves and both fuel 307 and water injectors (308) are shown on the side of the engine, as one possible configuration. In addition to or instead of fuel and water injectors, one or both chambers could use steam and/or gas injectors (not shown); the steam and/or high pressure, high temperature gas would be formed outside of the engine. Also, spark plugs (not shown), if necessary, could be used to ignite air/fuel mixture. Water injections could be used intermittently or simultaneously with fuel and/or gas injections. Inclusion of a steam injector would allow execution of a bottoming Rankine cycle, similar to the X-engine described above. The flow of water is shown as dashed lines in FIG. 3B. The cooling water 301-in enters the housing through the water supply lines within the piston into the pistons grooves, FIG. 4. This water, flowing within the piston's grooves, simultaneously cools the cylinder and piston and also seals the gap between piston and the cylinder, thus serving as a seal. The water will partially evaporate, forming water/steam mixture which serves as a lubricant as well. Again, as in the case of X-engine, the steam escaping from such a seals would mix with in-cylinder gas, and will eventually be exhausted from the engine and directed to a heat exchanger—boiler/superheater, where fresh steam will be formed to be injected into the engine through the steam injectors, thus implementing bottoming Rankine cycle.

The same six benefits outlined for X-engine will apply for the piston engine in FIGS. 3A, 3B and 4.

FIGS. 5 a) and b) provide some details of modifications to rotor that could be useful to prevent loss of pressurized cooling air to supercharge engine by strategically blocking off the exhaust port rib area with a plate (501) on one side, thereby blocking cooling air (502) from pressurizing exhaust port (503). FIG. 5 a) also demonstrates use of thermally conductive foam (504) to enhance the efficiency of heat transfer from the rotor's rim (505) in air cooled applications. In addition to foam, small ribs or "fins" (506), integral to Rotor's rim are very effective for cooling the rotor. Cooling air flow in the proximity of rotor's hub is not effective as rib's temperatures in this region is relatively low. Plates (507) could be used to direct the flow of air only to the rib's area to conserve on the cooling air flow requirements. Alternatively, plates (508), located in different axial planes of the rotor, could impart zig-zag air flow pattern, which in turn increase effectiveness of the heat exchange.

2-Stroke Design

Figure 6B:
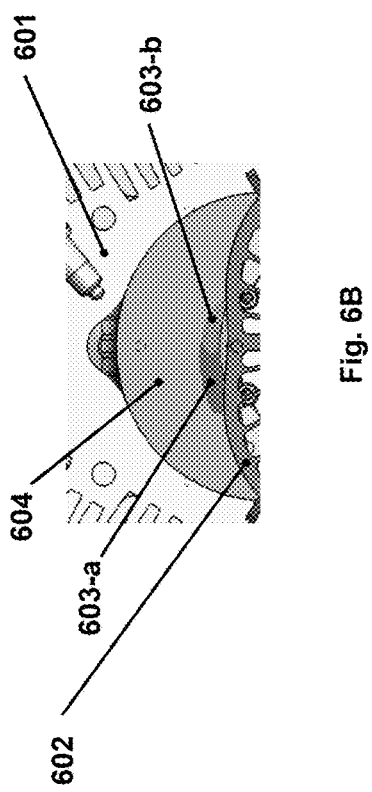
FIGS. 6A-6C schematically illustrate an embodiment of a 2-stroke engine based on X-engine geometry.
Figure 6A:
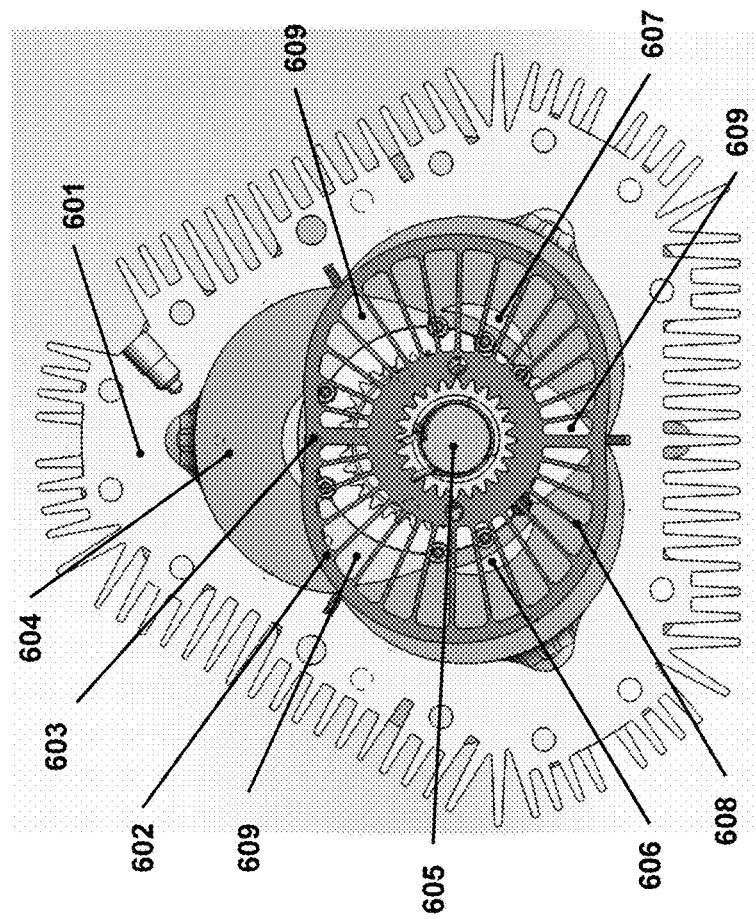
Figure 6C:
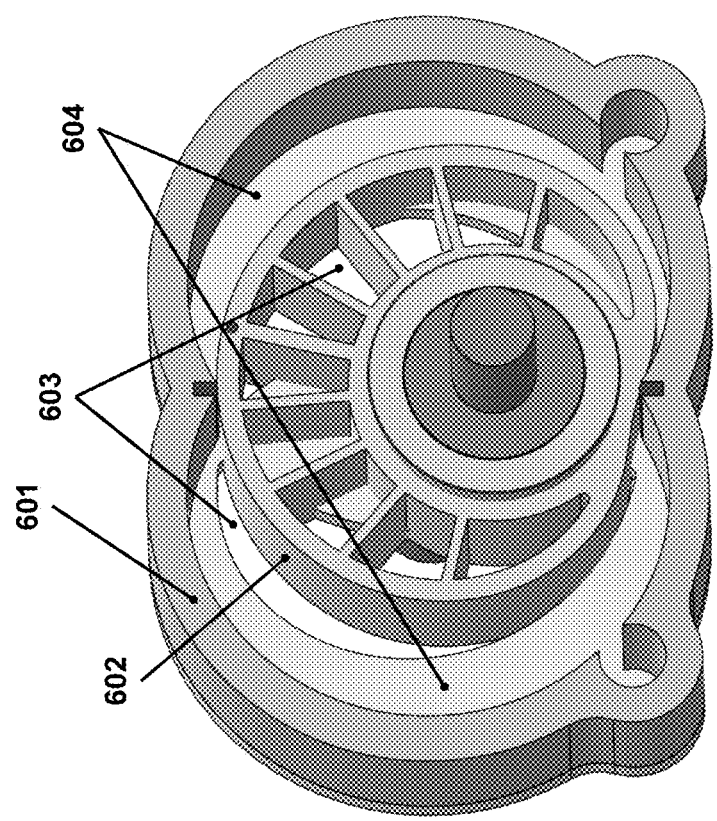

As it was mentioned above, the X engine design is suitable for both 2-stroke and 4-stroke operation. The 2-stroke embodiment of the X-engine is shown in FIGS. 6 *a*) and *b*); side ported x-engine, utilizing 2-lobed rotor and 3-lobed housing. In this figure, the front cover plate is not shown to allow for easier viewing. Rotor (602), shown in the bottom dead center position, rotates about the crankshaft (605), timed to the housing (601) and cover plate (604) via a gear mechanism. As the rotor (602) rotates, its seals (not shown) cross the ports (603, 606 and 607), effectively closing or opening them to their respective working chambers. Ports (603, 606 and 607) could be made in either side plate, but potentially different in shape or location to ports (603, 606 and 607) and could be made on the same side cover (604) and/or the opposing side cover (not shown) and is positioned and plumbed to act as an intake or exhaust port (hidden in this view).

Windows (609) are optional. An engine of this configuration could be used with any of the available combustion methods (spark ignited, compression ignition, HCCI, etc.)

Rotor (602) as shown is symmetric in nature, though asymmetric designs are also possible and would function similarly. In this configuration, both lobes of the rotor are used for compression and expansion portions of the cycle. The ribs (608) shown in this rotor are optional. Both sides of the rotor could be made solid (not shown).

FIG. 6.*b*) shows possible configuration of a 2-stroke X-engine architecture port areas. Ports 3-*a* (intake) and 3-*b* (exhaust) could be located on either or both side covers and/or could overlap. Generally, the exhaust port would open first causing the expanded gas to begin exhausting. The flow of air toward the exhaust port resumes as the intake is opened, and this flow helps draw in the intake charge, as is typical for a ported 2-stroke piston engine. Another approach is to flow pressurized air through the intake, e.g. an "air knife" to ensure fresh air enters the engine and exhaust gas is evacuated.

The seals (not shown) of the rotor (602) cross these ports and effectively open and close them off from communicating with the working chamber (604). The shape and locations of ports (603-*a*, 603-*b*) determine port timing, port flow area, port overlap, compression ratio and other critical engine parameters. One advantage this has over conventionally ported 2-stroke piston engine (with port symmetry about bottom dead center) is the ability to have port timing which is asymmetric about the engine bottom dead center. One way to use this advantage is to close the intake port after the exhaust port is closed when moving through the cycle. This coupled with forced induction of some manor (a supercharger or a turbocharger, or as shown above, especially an ejection compression supercharging), allows for the working chamber to be pressurized externally with fresh air, effectively trapping more fresh air mass, thereby enabling the engine to produce more power. Another way asymmetric port timing about bottom or top dead center could be used is to produce an over expanded cycle. Forced induction is also used in this design to scavenge residuals during the port overlap period and replace them with fresh working fluid. Port shape, area and upstream design and shape are critical to produce desired performance characteristics and can take on many different forms.

This 2-stroke operation is also applicable for any N-lobed rotor and (N+1)-lobed housing. A specific instance when N=1 is shown in FIG. 6 *c*), i.e. the rotor is 1-lobed and the housing is 2-lobed. The shape, function or location of windows (603) could be the same as shown in FIG. 6 or different.

The engine may use a combination of ports or poppet valves for intake and exhaust.

Seals

Regardless of how efficient the cycle or design is, if seals are not performing well, one can't expect high efficiency from the engine. Therefore, to further increase the efficiency of the engine, it is paramount to increase the effectiveness of seals. The embodiments below demonstrate the concepts for seal improvements for X-engine geometries. The seals designed and implemented for X-engine geometry, especially U-cup seal below, significantly improved measured performance of the rotary X engines, and the sealing performance surpassed that of a standard Wankel style engine and approached that of a conventional piston engine. It should be noted that these seals could be used in compressors or pumps, in addition to any engine, so we will talk about fluids—gas or liquids—as the media that needs to be sealed. In many cases the seals can be generalized to work in other types of rotary or piston engines, compressors or pumps.

Figure 7A:
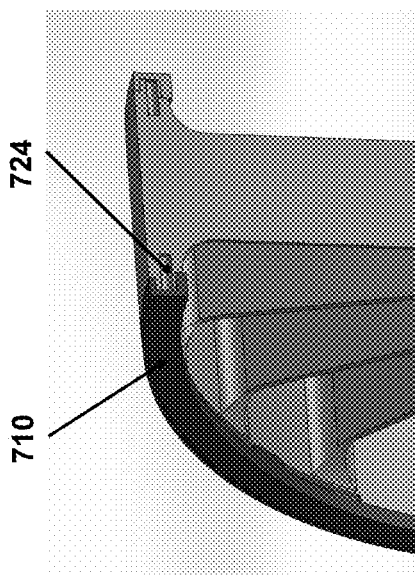
Figure 7B:
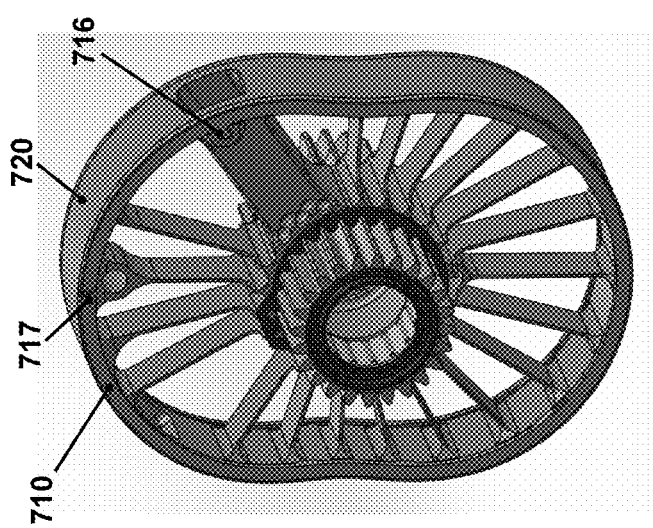
Figure 11B:
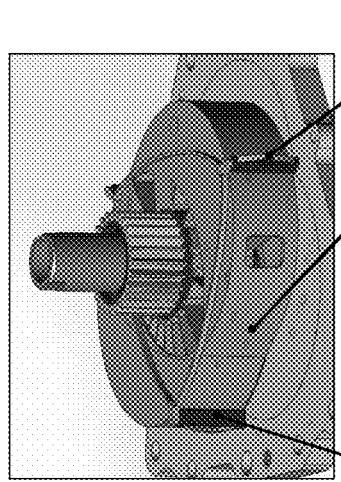
FIGS. 11A-11D schematically illustrate embodiments of stationary seals.
Figure 11D:
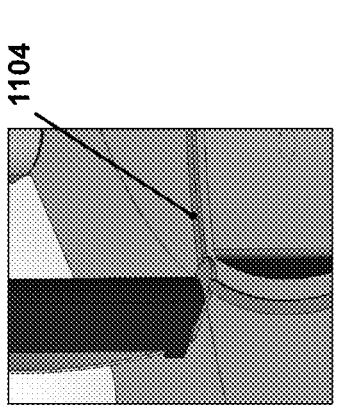
Figure 11A:
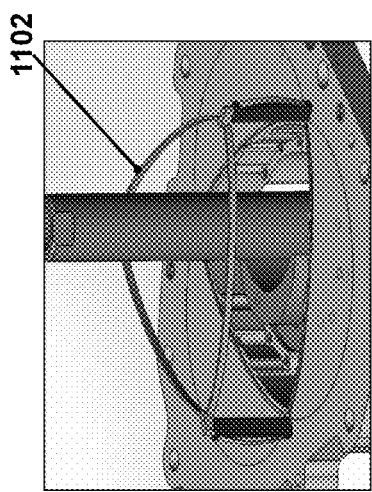
Figure 11C:
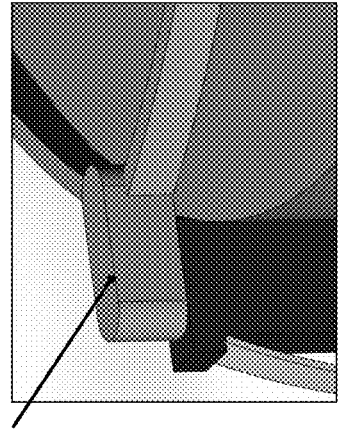

U-cup seal (710) is shown in FIGS. 7A-D together with a rotor (720) and apex seal (730, FIG. 7C). It has U-shape cross section (FIGS. 7C-E) consisting of outer member (711), back leg (712) and bridge (713) that connect these two legs. The seal (710) is situated on correspondingly shaped ridge of the rotor (720). The radial surface (714) of the outer member of U-cup seal is exposed to the fluid being sealed (liquid or gas). This surface (714) has equal or slightly smaller OD than the rotor's OD to avoid the contact with the apex seal (730) that rides on the said radial surface of the rotor (722). The fluid pressure acting upon surface (714) forces the seal's leg (711) to assume the contact with the ridge (721), thus sealing a leakage path for the fluid. The axial surface (715) of the outer member of U-Cup seal is in contact with stationary side covers (740) of the engine. The rear leg's (712) function is to prevent the seal from pulling away radially or sliding off the ridge of the rotor (721), as the seal can have an optional gap (717, FIG. 7A). Anti-rotational feature (716, FIG. 7A) on the seal matches the pocket in the rotor. Except for the initial preloading provided by the springs (750) located in the holes of the rotor's ridge, the U-cup seal is gas actuated—the pressure of fluid acting on the second exposed to fluid surface (718) provides axial force in the direction of an axial directional arrow pointing toward side cover 740 in FIG. 7C that forces the seal toward the side cover (740). Thus, the fluid pressurizes surfaces (714) and (718), forcing the seal against the stationary cover and against the ridge (721). To ensure that there will be no lift off of the seal from the stationary member (cover), the area of the surface (715), in contact with the cover, should be less than the sum of the projections of areas (714) and (718) onto the surface (715). For example, FIG. 8 schematically illustrates a projection 726 of surface area of the fluid-pressure receiving surface (e.g., 718; 714) of a seal onto the axial contact surface 715 of the seal, or alternately, a projection 726 of surface area of the fluid-pressure receiving surface (e.g., 718; 714) of a seal onto a plane defined by side cover 740, an a projection 727 of a fluid-pressure receiving surface (e.g., 718; 714) onto the same side cover 740. A calculation of this area (715) is rather complex, but the general principles are that the dynamic forces acting upon the U-cup seal (spring preload, gas pressure, frictional and inertial forces) would not lift off the seal from the side cover (740) and also the frictional forces should be minimized. A secondary (optional) strip seal (760, FIG. 7D) may also be used to further improve sealing characteristics of the U-cup seal, and may also help energize and provide stability for the primary U-cup seal. Such a secondary seal, placed in a conventional groove within a rotor (FIG. 7F), could be used in place of the ridge (721).

Still another improvement is shown in FIG. 7 *e*). This configuration consists of the U-cup seal placed not on the ridge of the rotor but rather the edge of the rotor and 4 piece apex seal (731, 732, 733, and 734) hence the name "4P Seal". The rotor-seal assembly consists of the rotor (720), U-cup seals (710), housing (770), an optional internal strip seal (760), apex seal triangle (733), apex seal long piece (732), button seals (731 and 734), coil springs (750) and leaf spring (780). The OD of U-cup seals (710) is bigger than the OD of rotor (720); the apex seal triangle (733) and apex seal long piece (732) are in contact with the rotor (720), while two U cup seals (710) are in contact on OD with buttons (731 and 734). All seals' components are spring and fluid activated. The housing (770) has the groove (not shown) cut out for U cup seal to fit into when the rotor is in top dead center position. Since button segments of apex seal run continuously over the radial surface of U-cup seal, the split in the U cup seal has to be done not perpendicular to surface contacting the stationary member, but rather at the sharp angle, say 15 degrees. This enable button seals to run smoothly over the split.

FIG. 9, shows optional springs (903) that could assist the U-cup seal to remain the contact with the ridge at the "waist" of the rotor—these segments tend to move away from the ridge due to centrifugal forces and friction.

In FIG. 10 is shown another embodiment of face seal—a plate face seal (1002) situated on the edge of the rotor (1001). The plate face seal (1002) can be manufactured by chemical etching, laser cut, machined or any other suitable technology. The plate seal has an anti-rotation slot in contact with a ridge (1003). In addition, if plate is made with high strength, high elastic limit and a low modulus material, no additional springs are needed to energize the seal; a small ridge (1006) on the rotor will push the plate seal toward the covers, while fluid pressure would take over during the operation of the device.

To ensure proper operation of the seal, the ID of plate face seal (1004) is slightly larger than OD of rotor groove (1005), while OD of the plate should be slightly smaller that OD of the rotor.

To ensure that there will be no lift off of the seal from the stationary member, the same rule used for U-cup seal applies here, namely, the area of the leg of the seal in contact with stationary surface should be less than the sum of the projections of areas exposed to pressurized fluid onto said surface.

In FIG. 11 is shown another embodiment of face seal—a stationary, strip seal (1102) situated within a groove in the covers (1104). The seal assembly consists of rotor (1101), stationary seal (1102), button seal (1103), cover (1104), apex seal assembly (1105), and leaf spring (1106). The stationary seal (1102) and button seal (1103) are sitting in the seal groove in cover (1104). Rotor (1101) has flat surfaces on sides. The rotor (1101), apex seal assembly (1105), stationary seals (1102) and button seals (1103) and housing together formed a sealing chamber. Leaf spring (1106) is pushing apex seal assembly (1105) toward the rotor (1101) OD. Coil springs are pushing stationary seals (1102) and button seals (1103) on to the rotor (1101) side surface.

The rotor of the engine could be made from a single material, such as steel, aluminum, ceramics, etc., or to be made of two or more materials. FIG. 12 shows an example of how a rotor could be made with a sleeve, which might give rotor some advanced properties, such as low wear and friction rates, high temperature capabilities, etc. The rotor (1201) is shown inserted into the sleeve (1202) in FIG. 12 *a*). The "tongue and groove" feature (1203) in sleeve and the rotor could be used to keep the sleeve congruent with rotor as well as de-rotation feature. In addition, the sleeve could be used as a rotor ridge that is required in many seal designs presented above; as an example, see FIG. 12 *c*) showing U-cup style seal (1205), mounted on the sleeve (1202). Finally, the sleeve or the rotor itself may have some flow features (1204), which could, potentially, limit the amount of burnt gas return during the intake stroke.

Figure 13C:
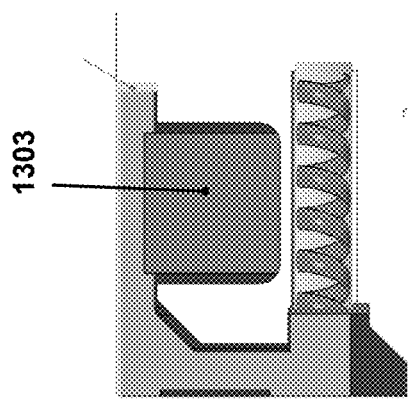
FIGS. 13A-13C schematically illustrate additional embodiments of seals.
Figure 13B:
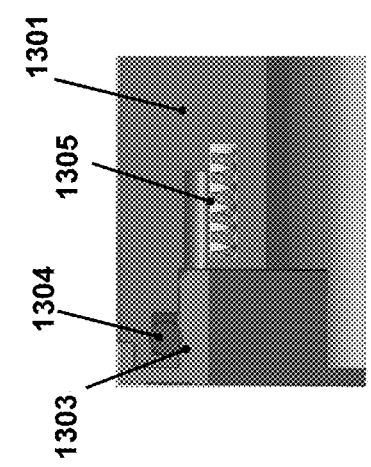

FIGS. 13 *a*)-*c*) display additional variations of U-cup seal, which include various flexible sealing elements (polymer or metal: strip, hollow O-ring, C-ring, E-ring, Quad-ring, X-ring, etc.) to aid in sealing performance. All of these flexible elements work in conjunction with primary seal, which experience most of the pressure and temperature. The flexible element forms a secondary seal that is energized by its own elastic properties, while during the operation it will be energized by the fluids that escape past primary seal.

A FIGS. 13 *a*)-*c*) and FIGS. 14 *a*)-*l*) demonstrate possible examples of how such a flexible elements could be used: (1301, 1401)—rotor; (1302, 1402)—sleeve; (1303, 1403)—primary sealing elements; (1304, 1404)—flexible, secondary seal; (1305, 1405) a pre-load spring, (1406) container metal ring and (1407) a tungsten wire, which is activated by the gas pressure and wedges between primary seal and the rotor. This last concept will also work well with a plate seal described in FIG. 10.

As before, within exception of seals that use tungsten wire, the sealing surfaces of all these seals, i.e. the surfaces in contact with side covers (plates) should be made in such a way that the area of the surface, in contact with the cover, should be less than the sum of the projections of areas exposed to pressurized gases onto this surface. These contact surfaces are not shown in FIG. 14 for clarity of other features.

Figure 13A:
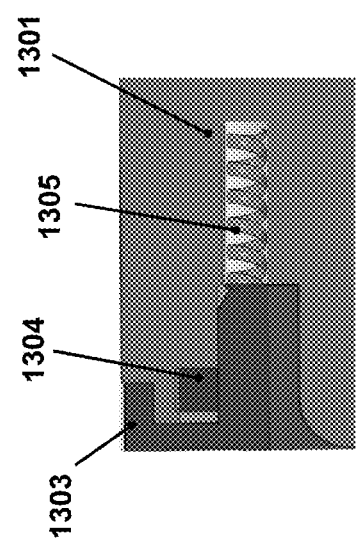
Figure 14I:
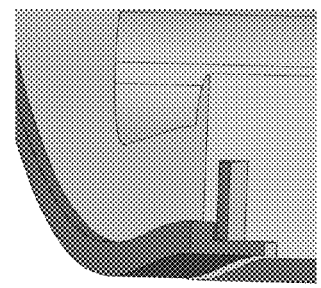
Figure 14H:
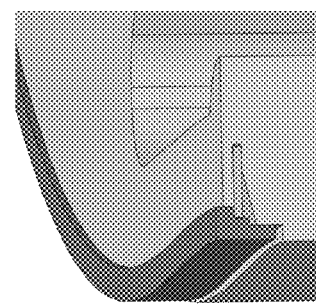
Figure 14G:
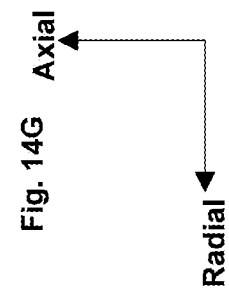
Figure 14F:
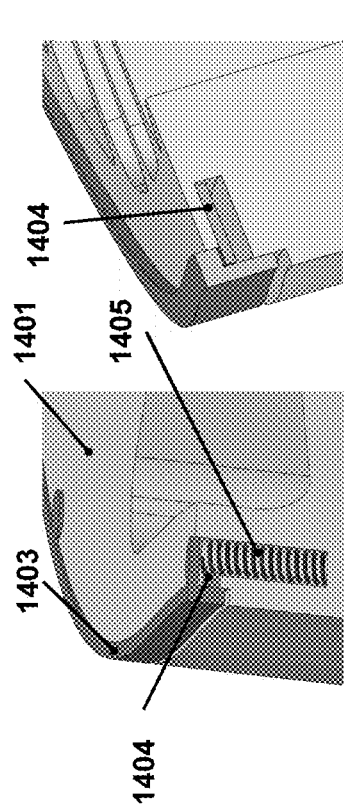

FIG. 13A illustrates an embodiment of an improved seal for an engine in category (1) or for (2) a rotary compressor or for (3) a rotary pump. In this embodiment, there is provided an improved rotary engine (or compressor or pump) of the type having an epitrochoidal rotor rotating about an axis, a housing, and first and second laterally disposed covers. The improvement includes a first face seal disposed in a first epitrochoidally shaped corner formed by a junction of the first cover with the housing, the first face seal having a generally U-shaped cross section, in a plane passing through the axis, so that the first face seal has an outside leg that is distal with respect to the axis and an inside leg that is proximal with respect to the axis, the two legs joined by a bridge of the U-shape, wherein the outside leg is disposed in a corresponding outside notch of the rotor and the inside leg is disposed in a corresponding inside notch of the rotor. Optionally, this embodiment has an anti-rotation feature, which prevents rotation of the seal relative to the rotor, similar to the one shown in FIG. 15, employing generally round pads attached to the seal and projecting radially inward toward the axis into a corresponding recess in the rotor.

In a further related embodiment, the improvement includes a second face seal disposed in a second epitrochoidally shaped corner formed by a junction of the second cover with the housing, the second face seal having a generally U-shaped cross section, in a plane passing through the axis, so that the second face seal has an outside leg that is distal with respect to the axis and an inside leg that is proximal with respect to the axis, the two legs joined by a bridge of the U-shape, wherein the outside leg is disposed in a corresponding outside notch of the rotor and the inside leg is disposed in a corresponding inside notch of the rotor.

Optionally, the bridge of the U-shape of the first face seal includes a channel, disposed in a surface thereof that is in contact with the first cover, the channel retaining a component therein, the component selected from the group consisting of water, lubricant, and a combination of water and lubricant.

In the case when tungsten wire is used as a secondary seal, the sealing surfaces of side seals, i.e. the surfaces in contact with side covers (plates) should be made in such a way that the area of the surface, in contact with the cover, should be less than the sum of the projections of areas exposed to pressurized gases plus projection of tungsten wire onto this surface.

Combustion

To further increase the efficiency of the engine it is necessary to enhance a combustion process. FIG. 15 shows High Velocity Combustion Chamber (1501). The combustion chamber is a recess within the Housing (1502) and has an asymmetrical shape. For example, the shape of the recess 1501 may be described as being asymmetrical about a line that passes through the recess 1501 and a center point of the housing 1502.

The internal housing profile (1503) meets with the combustion chamber in two areas: the leading edge (1504) and trailing edge (1505). When the rotor approaches TDC, the sharp leading edge (1504) generates a counterclockwise air vortex within the combustion chamber (1501) which is maintained and guided by the trailing edge. The air vortex increases charge motion, and improves fuel and air mixing, while accelerating the combustion process, both key parameters for engine efficiency and performance. The air vortex reaches tangential air velocity with peak of 45 m/s, while operating in normal automotive engine speed. FIG. 16 presents an additional feature of the high speed combustion chamber: accommodating injection plume (1506). When the engine is operating with direct fuel injection, the elongated shape of the combustion chamber can accommodate the full fuel plume, thus eliminating fuel wall impingement, a known cause for poor combustion and higher toxic emissions.

FIGS. 15 and 16 schematically illustrate a rotary engine of the type having a rotor 1509 having N lobes, an intake port for intake of a working medium, an exhaust port, and a housing with respect to which the rotor is mounted for rotational motion relative to the housing, the housing having N+1 lobe-receiving regions and (i) a peak disposed between each pair of adjacent N+1 lobe-receiving regions and (ii) a pair of sides, the N+1 lobe-receiving regions further configured in relation to the rotor to successively receive the N lobes as the rotor rotates relative to the housing, so as to establish chambers, a chamber associated with each one of the N+1 lobe-receiving regions, wherein at least one chamber of the established chambers is configured to handle, in succession, intake, compression of the working medium and injection of fuel, combustion, expansion, and exhaust phases. The engine includes a recess 1501 in the housing associated with each chamber wherein combustion occurs, the recess asymmetrically shaped so as to create a vortex in the working medium in the course of compression and injection of fuel. In some embodiments, the recess 1501 has an elongated, drop-like shape, which is most easily seen in FIG. 16, having a narrow end (e.g., where fuel injector 1510 injects a plume 1506 of fuel) and a wider end distal from the narrow end. That shape accommodates a shape and volume associated with a plume 1506 of fuel injected therein (e.g., as noted above, the elongated shape of the combustion chamber/recess 1501 can accommodate the fuel plume, thus eliminating fuel wall impingement, a known cause for poor combustion and higher toxic emissions).

Improved Fuel Injection

To further enhance the combustion efficiency, it is critical to provide for a good mixing of fuel and combustion air. Generating a high speed vortex described above could be supplemented by injector, which penetration length is small and which generates droplets of a very small size—in a range of 5-10 microns. Typically, this is accomplished with air assisted injectors (Orbital and others; also see U.S. Pat. No. 5,520,331, which described air assisted liquid atomizing nozzle used to minimize water consumption in fire-fighting applications); this requires a separate small compressor to provide for a pressurized air. In this invention we present an approach that is similar to that described in U.S. Pat. No. 5,520,331, but which does not require an air compressor.

Rotor Manufacturing

Figure 17F:
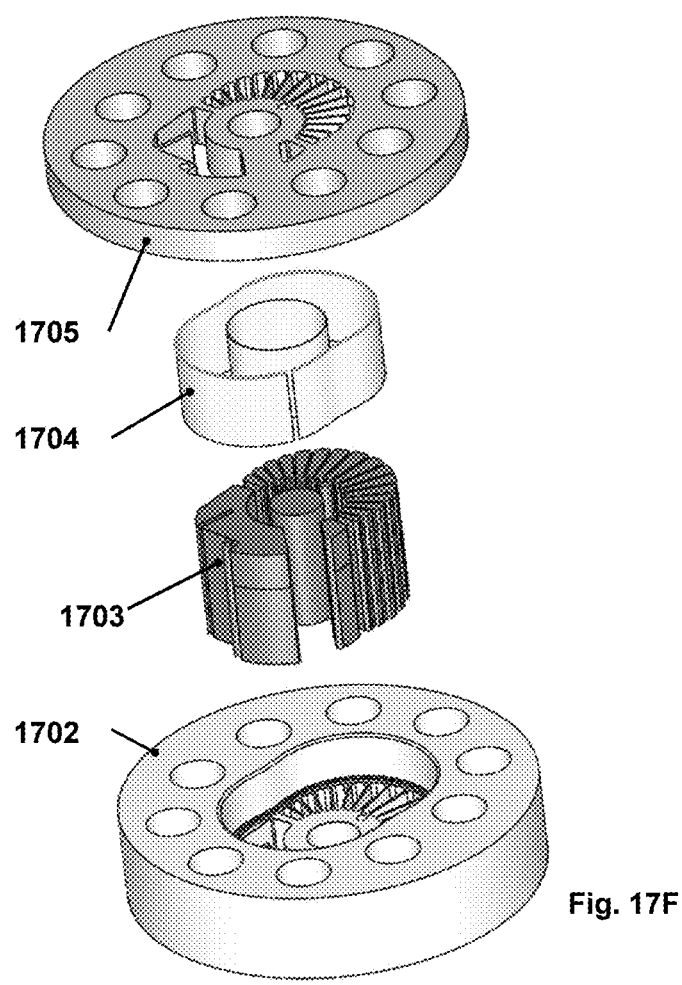

To increase the efficiency and power of X-engines further, it is beneficial to increase the operating temperature of the engine and to reduce friction (and wear). A rotor made entirely of ceramics provides great promise to achieve these goals, but is extremely expensive to manufacture. A less expensive and better solution could be provided by specially manufactured rotor using gradient powder deposition, metal powder metallurgy processes, described in, for example, [Dry Powder Deposition and Compaction for Functionally Graded Ceramics" Zachary N. Wing and John W. Halloran, Department of Materials Science Engineering, University of Michigan, Ann Arbor, Mich. 48109]. The rim of the rotor could be made utilizing mixture of ceramics and/or metal and/or graphite powders, while the central part of the rotor made out of aluminum or titanium or any other light metal powders. The method of making such a rotor is shown in FIG. 17. The rotor is fabricated inside mold (1701, FIG. 17 a)), composed of base (1702), inserts (1703), removable thin guides (separators) (1704) and cover (1705), all shown in FIG. 17 f). Powders are deposited "gradiently" (i.e., non-uniformly in 3D space) into the spaces between the base, cover and inserts, FIG. 17 b). The gradient deposition could be accomplished in radial and/or axial directions and could be made asymmetric, not only in terms of geometry, but in terms of powder composition as well. The gradients are created by metered robotic powder dispensing system or manually with help of removable thin guides (1704). After that guides are removed, leaving a gradient mix of materials (1706) between the base and insert (FIG. 17 d)); mold cover is then placed on the base (FIG. 17 e)) and the mold is subjected to compacting and sintering under large pressures and, optionally, temperatures. Mold could be also vibrated to enhance the dispersion of powder layers into one another.

| Reference Numbers | | |
|---|---|---|
| Ref. No. | FIG. | Item |
| 100 | 1A | Combined heat and power system (CHP) |
| 101 | 1A | Engine |
| 102 | 1A | Alternator |
| 103 | 1A | Valve |
| 104 | 1A | Water source |
| 105 | 1A | De-ionizer |

-continued

| Ref. No. | FIG. | Item |
|---|---|---|
| 106 | 1A | Pump |
| 108 | 1A | Catalytic converter |
| 109 | 1A | Heat exchanger 1 |
| 110 | 1A | Grid interconnect/power electronics box |
| 120 | 1A | ECU |
| 130 | 1A | Cyclone separator |
| 131 | 1A | Filter |
| 132 | 1A | Heat exchanger 2 |
| 135 | 1A | Return water line |
| 201 | 2a | Housing |
| 202 | 2a | Cover plates |
| 203 | 2a, 2e | Rotor |
| 204 | 2a, 2b | Apex seals |
| 205 | 2a, 2b, 2c, 8, 13 | Face seals |
| 206 | 2b, 2c, 8, 13 | Cover plate |
| 232 | 2a | Intake port |
| 235 | 2a | Air charge |
| 241 | 2e | Half of seal |
| 242 | 2e | Half of seal |
| 243 | 2e | Channel |
| 244 | 2e, 2d | Spring |
| 245 | 2d | Energized pad |
| 246 | 2d | Ceramic roller |
| 261 | 2b & 2c | Metering orifice |
| 262 | 2b, 8, 13 | Metering orifices, entrance |
| 263 | 8, 13 | Metering orifice exit |
| 271-in | 2b | Water flow-in |
| 271-out | 2b | Water flow-out |
| 272-in | 2b | Water flow-in |
| 272-out | 2b | Water flow-out |
| 272-in | 2b | Water flow-in |
| 273-out | 2b | Water flow-out |
| 281 | 2b, 2c, 8, 13 | Water stream, Flow |
| 300 | 3A | Engine |
| 301-in | 3B | Water in |
| 301-out | 3B | Water out |
| 302 | 3B | Housing |
| 303 | 3B | Piston |
| 304 | 4 | Grooves |
| 305 | 3B; 4 | Supply line |
| 306 | 3B | Combustion chamber |
| 307 | 3A | Fuel injector |
| 308 | 3A | Water injector |
| 501 | 5a, 5b | Plate |
| 502 | 5a, 5b | Cooling air |
| 503 | 5a, 5b | Exhaust port |
| 504 | 5a | Thermally conductive foam |
| 505 | 5a | Rotor's rim |
| 506 | 5a | Fins |
| 507 | 5a | Plates |
| 508 | 5a | Plates |
| 601 | 6a, 6b | Housing |
| 602 | 6a, 6b | Rotor |
| 603 | 6a, 6b, 6c | Ports, Windows |
| 603-a | 6b | Ports |
| 603-b | 6b | Ports |
| 604 | 6a, 6b | Plate, Side cover, Working chamber |
| 605 | 6a, 6b | Crankshaft |
| 606 | 6a, 6b | Ports |
| 607 | 6a, 6b | Ports |
| 609 | 6a, 6b | Windows |
| 608 | 6a, 6b | Ribs |
| 710 | 7a, 7d, 7e | U-cup seal |
| 711 | 7e | Front leg |
| 712 | 7e | Back leg |
| 713 | 7e | Bridge |
| 714 | 7e | Radial surface, Surface, Areas |
| 715 | 7e | Axial Surface, Surface, Area |
| 716 | 7a | Anti-rotational feature |
| 717 | 7a | Optional gap |
| 718 | 7a | Fluid surface, Areas |
| 719 | 7c | Inner radial contact surface |
| 720 | 7a, 7d, 7e | Rotor |
| 721 | 7e, 7f | Rotor Ridge |
| 722 | 7e | Rotor's OD, Rotor, Holes |
| 724 | 7b; 7c | Spring seat |
| 725 | 7c | Peripheral corner cut-out |
| 726 | 8 | Projection of the of surface area, of the fluid-pressure receiving surface |
| 727 | 8 | Projection of the axial contact surface |
| 730 | 7c, 7e | Apex seal |
| 731 | 7e | 4 piece apex seal, Button seals, Buttons |
| 732 | 7e | 4 piece apex seal, Apex seal long piece |
| 733 | 7e | 4 piece apex seal, Apex seal triangle |
| 734 | 7e | 4 piece apex seal, Button seals, Buttons |
| 740 | 7e | Side covers |
| 750 | 7a, 7e | Springs, Coil springs |
| 760 | 7d, 7e | Strip seal |
| 770 | 7e | Housing |
| 780 | 7e | Leaf spring |
| 903 | 9 | Springs |
| 1001 | 10 | Rotor |
| 1002 | 10 | Plate face seal |
| 1003 | 10 | Ridge |
| 1004 | 10 | Plate face seal, seal groove in cover |
| 1005 | 10 | Rotor groove, Apex seal assembly |
| 1006 | 10 | Small ridge |
| 1007 | 10 | Cover member |
| 1008 | 10 | Axial contact surface |
| 1009 | 10 | Plate member |
| 1010 | 10 | Slot |
| 1020 | 10 | Opening between ribs |
| 1101 | 11 | Rotor |
| 1102 | 11 | Strip seal, Stationary seals |
| 1103 | 11 | Button seal |
| 1104 | 11 | Covers |
| 1105 | 11 | Apex seal assembly |
| 1106 | 11 | Leaf spring |
| 1201 | 12 | Rotor |
| 1202 | 12, 12c | Sleeve |
| 1203 | 12a | "Tongue and groove" feature |
| 1204 | 12c | Flow features |
| 1205 | 12c | U-cup style seal |
| 1301 | 13a-c and 14a-1 | Flexible elements |
| 1302 | 13a-c and 14a-1 | Rotor |
| 1303 | 13a-c and 14a-1 | Sleeve |
| 1304 | 13a-c and 14a-1 | Sealing elements |
| 1305 | 13a-c and 14a-1 | Secondary seal |
| 1306 | 13a-c and 14a-1 | Pre-load spring |
| 1307 | 13a-c and 14a-1 | Container metal ring |
| 1401 | 14a-1 | Rotor |
| 1402 | 14a-1 | Sleeve |
| 1403 | 14a-1 | Primary seal |
| 1404 | 14a-1 | Secondary seal |
| 1405 | 14a-1 | Pre-load spring |
| 1406 | 14a-1 | Container metal ring |
| 1407 | 14a-1 | Tungsten wire |
| 1501 | 15a | High velocity combustion chamber |
| 1502 | 15a | Housing |
| 1503 | 15a | Internal housing profile |
| 1504 | 15a | Leading edge |
| 1505 | 15a | Trailing edge |
| 1506 | 16 | Injection plume |
| 1509 | 16 | Rotor |
| 1510 | 16 | Fuel injector |
| 1701 | 17a, 17f | Mold |
| 1702 | 17a, 17f | Base |
| 1703 | 17a, 17f | Inserts |
| 1704 | 17a, 17b, 17f | Removable thing guides (separators) |
| 1705 | 17a, 17f | Cover |
| 1706 | 17b, 17d | Mix of materials |

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A U-cup shaped seal, intended to seal the gap between the stationary and moving member and consisting of two legs and the bridge that connect these legs, such that the front leg is exposed on two surfaces to the pressurizing fluid, the third surface in contact with stationary surface and the forth surface in contact with the matching surface of the ridge of the moving member the area of the leg of the seal in contact with stationary surface being less than the sum of the projections of areas exposed to pressurized fluid on said surface.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A rotary machine comprising:
    a side housing;
    a rotor having an axial surface; and
    a seal assembly for sealing a gap between the axial surface of the rotor and the side housing, the seal assembly comprising:
    a face seal having:
    an outer member having (i) a first surface, being an axial contact surface in contact with the side housing, (ii) a second surface, being an outer radial surface exposed to pressure of fluid being sealed, (iii) a third surface, opposite the first surface, disposed axially inward from the first surface and also exposed to pressure of the fluid being sealed, and (iv) a fourth surface, being an inner radial contact surface, opposite to the second surface and disposed radially inward from the second surface, the fourth surface being in contact with the rotor;
    wherein the first surface, the second surface, and the third surface are shaped so that the pressure of the fluid causes a net force by which the first surface is axially loaded against the side housing and the fourth surface of the outer member is radially loaded against the rotor, and
    wherein the face seal further includes a second member coupled to the outer member, the second member spanning a radial distance inwardly from the outer member, and extending radially inward further than a most radially inward aspect of the fourth surface.

2. A rotary machine according to claim 1, wherein the face seal further comprises an axially loaded spring disposed between the second member and a feature of the rotor, so as to cause further axial loading of the first surface against the side housing.

3. A rotary machine according to claim 2, further comprising a secondary seal, disposed between the axially loaded spring and the second member, so that the secondary seal is axially loaded by the spring and radially loaded against the rotor by pressure of any fluid that has blown by the inner radial contact surface.

4. A rotary machine according to claim 1, further comprising a flexible secondary seal, disposed radially between the rotor and the face seal.

5. A rotary machine according to claim 1, wherein the seal assembly further includes a set of springs, coupled to the face seal and the rotor and configured to pull the outer member radially inward such that the fourth surface remains radially loaded against the rotor.

6. A rotary machine according to claim 1, wherein the face seal further includes
    a plate member connected to the outer member and disposed along the first surface in a direction radially inward from the outer member; and
    an anti-rotation slot disposed within the plate member to receive a corresponding axially projecting ridge of the rotor to prevent rotation of the face seal relative to the rotor.

7. A rotary machine according to claim 6, wherein the plate member includes a set of openings therein to allow passage of cooling air through the rotor.

8. A rotary machine according to claim 1, wherein the rotor has a radial face, the rotary machine further comprising:
    a sleeve disposed circumferentially over the radial face;
    wherein the sleeve has a tongue projecting radially inward and the rotor has a corresponding radially indented groove in which to receive the tongue.

9. A rotary machine according to claim 8, further comprising:
    a side seal assembly, disposed on the radial face of the rotor, the side seal assembly having a primary seal and a compressible secondary seal, the secondary seal being in contact with the primary seal and disposed in a groove of the rotor.

10. A rotary machine according to claim 8 having a peripheral corner cut-out for a correspondingly shaped side seal.

11. A rotary machine according to claim 8, wherein the rotor rotates relative to the side housing to establish a working chamber, the rotary machine further having an intake port for allowing fresh medium into the working chamber and an exhaust port for allowing burnt gasses to exit from the working chamber.

* * * * *

UNITED STATES PATENT AND TRADEMARK OFFICE
CERTIFICATE OF CORRECTION

| | | |
|---|---|---|
| PATENT NO. | : 11,149,547 B2 | Page 1 of 1 |
| APPLICATION NO. | : 15/700641 | |
| DATED | : October 19, 2021 | |
| INVENTOR(S) | : Shkolnik et al. | |

It is certified that error appears in the above-identified patent and that said Letters Patent is hereby corrected as shown below:

In the Specification

In Column 1, Line 41:
Insert the following sentence:
--This invention was made with government support under HR0011-15-9-0005 awarded by The Defense Advanced Research Projects Agency. The government has certain rights in the invention.--

Signed and Sealed this
Third Day of October, 2023

Katherine Kelly Vidal
*Director of the United States Patent and Trademark Office*